(12) United States Patent
Belleschi et al.

(10) Patent No.: US 12,745,158 B2
(45) Date of Patent: Sep. 22, 2026

(54) METHODS AND NETWORK NODES FOR HANDLING COMMUNICATION

(71) Applicant: Telefonaktiebolaget LM Ericsson (publ), Stockholm (SE)

(72) Inventors: Marco Belleschi, Solna (SE); Ajmal Muhammad, Sollentuna (SE); Per-Erik Eriksson, Stockholm (SE); Mattias Bergström, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 417 days.

(21) Appl. No.: 18/272,250

(22) PCT Filed: Jan. 13, 2022

(86) PCT No.: PCT/SE2022/050028

§ 371 (c)(1),
(2) Date: Jul. 13, 2023

(87) PCT Pub. No.: WO2022/154728

PCT Pub. Date: Jul. 21, 2022

(65) Prior Publication Data

US 2024/0073779 A1 Feb. 29, 2024

Related U.S. Application Data

(60) Provisional application No. 63/137,176, filed on Jan. 14, 2021.

(51) Int. Cl.
*H04W 40/22* (2009.01)
*H04L 45/28* (2022.01)

(52) U.S. Cl.
CPC ............. *H04W 40/22* (2013.01); *H04L 45/28* (2013.01)

(58) Field of Classification Search
CPC ..... H04W 40/04; H04W 40/22; H04W 28/02; H04W 28/0263; H04W 28/0273; H04W 80/02; H04L 45/28
See application file for complete search history.

(56) References Cited

U.S. PATENT DOCUMENTS

2022/0210699 A1* 6/2022 Mukherjee ............ H04W 40/20
2022/0225129 A1* 7/2022 Chen .................... H04W 24/04
(Continued)

OTHER PUBLICATIONS

International Search Report and Written Opinion of the International Searching Authority, PCT/SE2022/050028, mailed May 23, 2022, 12 pages.

(Continued)

*Primary Examiner* — Mohamed A Kamara
(74) *Attorney, Agent, or Firm* — Sage Patent Group

(57) ABSTRACT

A method performed by a first network node for handling communication in a wireless communications network. The first network node receives a data packet with a header including an indicated destination, with a BAP address, and one or more values interpreted by the first network node as reserved or unknown. The first network node checks whether the first network node is an intended destination of the data packet based on the indicated destination in the header. With the proviso that the first network node is not the intended destination of the data packet and the BAP address is not included in the configured backhaul, BH, routing configuration, the first network node discards the data packet; and else, processes the data packet.

18 Claims, 28 Drawing Sheets

(56) References Cited

U.S. PATENT DOCUMENTS

| | | | | |
|---|---|---|---|---|
| 2022/0312529 A1* | 9/2022 | Vangala | ................ | H04W 76/12 |
| 2023/0292217 A1* | 9/2023 | Jung | ..................... | H04W 40/14 |
| 2025/0184824 A1* | 6/2025 | Mukherjee | ............ | H04W 76/11 |

OTHER PUBLICATIONS

3GPP TS 38.340 v0.2.1 (Feb. 2020); 3rd Generation Partnership Project; Technical Specification Group Radio Access Network; NR; Backhaul Adaption Protocol (BAP) specification (Release 16), 20 pages.
Villamizar, C. et al., "MPLS Forwarding Compliance and Performance Requirements," Internet Engineering Task Force (IETF), Request for Comments: 7325 (RFC 7325), Aug. 2014, 60 pages.
3GPP TS 23.501 v15.6.0 (Jun. 2019); 3rd Generation Partnership Project; Technical Specification Group Services and System Aspects; System Architecture for the 5G System; Stage 2 (Release 15), 243 pages.
3GPP TS 33.210 v16.2.0 (Jun. 2019); 3rd Generation Partnership Project; Technical Specification Group Services and System Aspects; 3G security; Network Domain Security (NDS); IP network layer security (Release 16), 28 pages.
3GPP TS 33.501 v15.6.0 (Sep. 2019); 3rd Generation Partnership Project; Technical Specification Group Services and System Aspects; Security architecture and procedures for 5G system (Release 15), 190 pages.
3GPP TS 38.300 v15.6.0 (Jun. 2019); 3rd Generation Partnership Project; Technical Specification Group Radio Access Network; NR; NR and NG-RAN Overall Description; Stage 2 (Release 15), 99 pages.
3GPP TS 38.340 v16.2.0 (Sep. 2020); 3rd Generation Partnership Project; Technical Specification Group Radio Access Network; NR; Backhaul Adaption Protocol (BAP) specification (Release 16), 22 pages.
3GPP TS 38.463 v15.6.0 (Dec. 2019); 3rd Generation Partnership Project; Technical Specification Group Radio Access Network; NG-RAN; E1 Application Protocol (E1AP) (Release 15), 179 pages.
3GPP TS 38.473 v16.3.1 (Oct. 2020); 3rd Generation Partnership Project; Technical Specification Group Radio Access Network; NG-RAN; F1 application protocol (F1AP) (Release 16), 455 pages.
3GPP TS 38.473 v15.6.0 (Jul. 2019); 3rd Generation Partnership Project; Technical Specification Group Radio Access Network; NG-RAN; F1 application protocol (F1AP) (Release 15), 220 pages.
3GPP TS 38.340 v16.200 (Mar. 2020); 3rd Generation Partnership Project; Technical Specification Group Radio Access Network; NR; Backhaul Adaption Protocol (BAP) specification (Release 16), 20 pages.
3GPP TR 38.874 v16.0.0 (Dec. 2018); 3rd Generation Partnership Project; Technical Specification Group Radio Access Network; NR; Study on Integrated Access and Backhaul; (Release 16), 111 pages.
3GPP TS 38.340 V16.3.0 (Dec. 2020) 3rd Generation Partnership Project; Technical Specification Group Radio Access Network; NR; Backhaul Adaptation Protocol (BAP) specification (Release 16).
Huawei Hisilicon, "Miscellaneous corrections to 38.340 for IAB", 3GPP TSG-RAN WG2 Meeting #110, R2-2006408, electronic, Jun. 1-12, 2020. (Change Request 38.340 CR 0001 rev 4 Current version: 16.0.0).
3GPP TS 38.331 v16.2.0 (Sep. 2020); 3rd Generation Partnership Project; Technical Specification Group Radio Access Network; NR; Radio Resource Control (RRC) protocol specification (Release 16), 921 pages.

* cited by examiner

| Fields | Octet |
|---|---|
| D/C, PDU Type, R, R, R | Oct 1 |
| BH RLC channel ID | Oct 2 |
| BH RLC channel ID (cont.) | Oct 3 |
| Available Buffer Size | Oct 4 |
| Available Buffer Size (cont.) | Oct 5 |
| Available Buffer Size (cont.) | Oct 6 |
| BH RLC channel ID | Oct 7 |
| BH RLC channel ID (cont.) | Oct 8 |
| Available Buffer Size | Oct 9 |
| Available Buffer Size (cont.) | Oct 10 |
| Available Buffer Size (cont.) | Oct 11 |

...

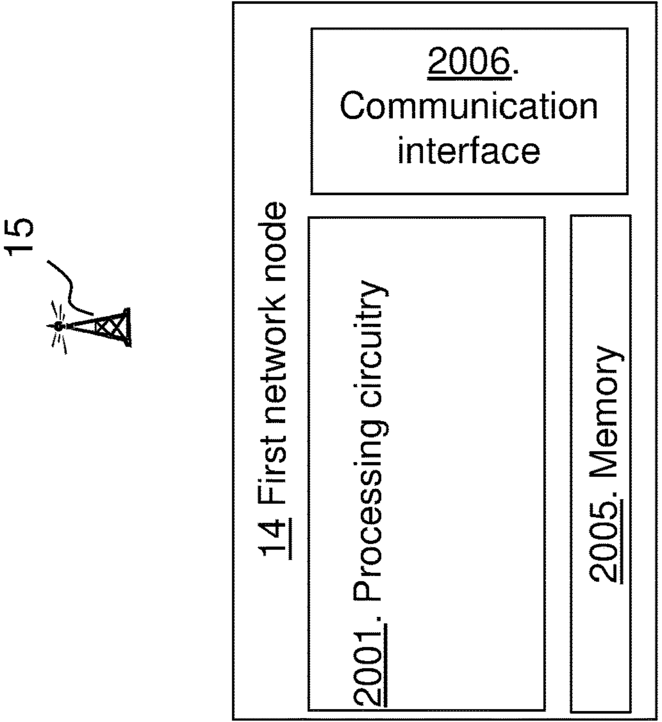
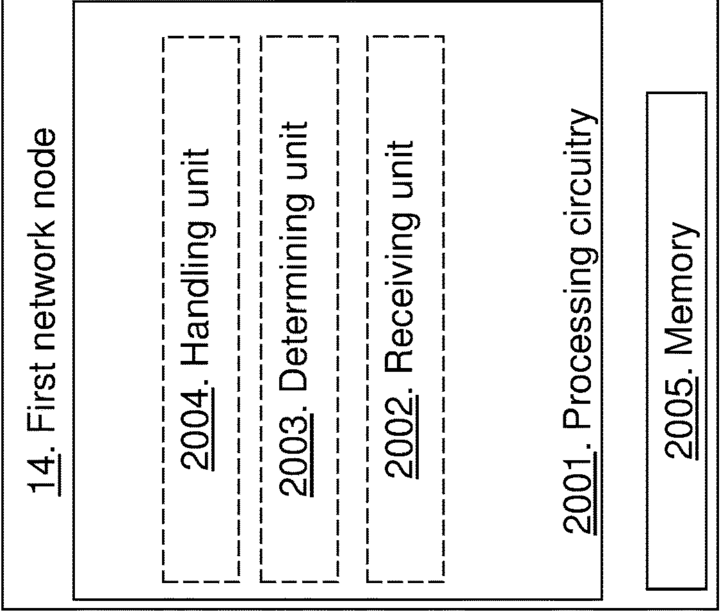
FIG. 20
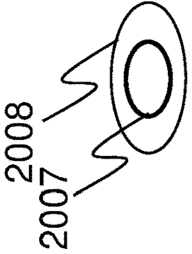

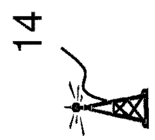
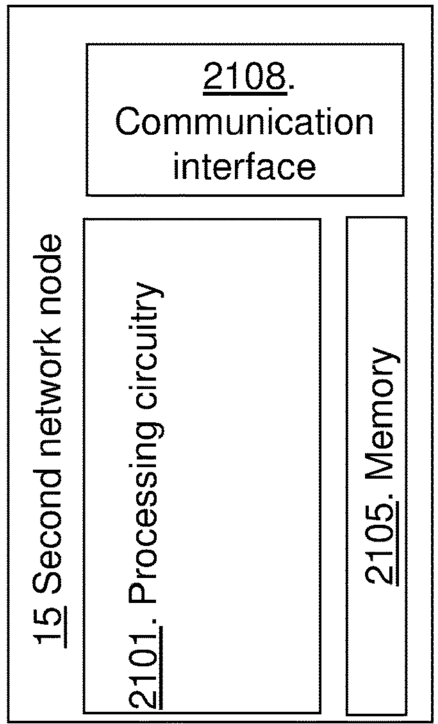
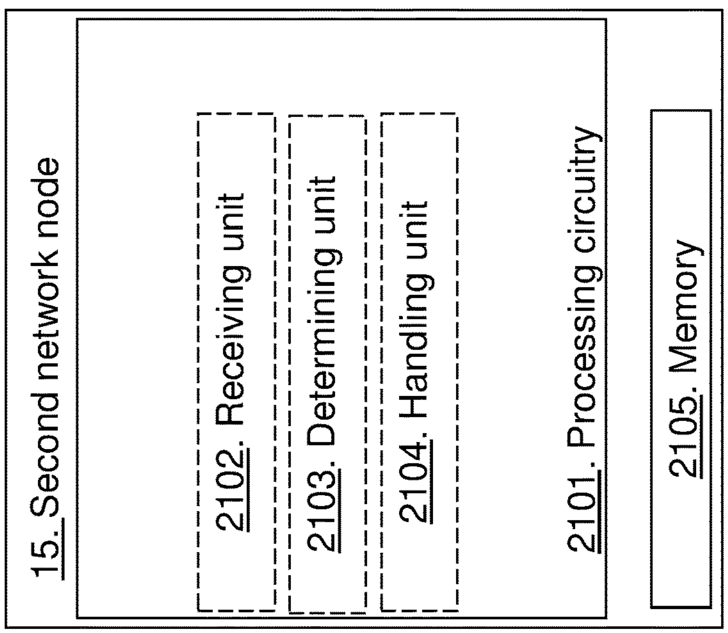
FIG. 21
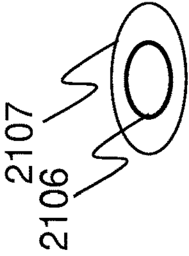

METHODS AND NETWORK NODES FOR HANDLING COMMUNICATION

CROSS REFERENCE TO RELATED APPLICATIONS

This application is a 35 U.S.C. § 371 national stage application of PCT International Application No. PCT/SE2022/050028 filed on Jan. 13, 2022, which in turn claims domestic priority to U.S. Provisional Patent Application No. 63/137,176, filed on Jan. 14, 2021, the disclosures and content of which are incorporated by reference herein in their entirety.

TECHNICAL FIELD

Embodiments herein relate to a first network node, a second network node, a control network node and methods performed therein regarding wireless communication. Furthermore, a computer program and a computer readable storage medium are also provided herein. In particular, embodiments herein relate to handling communication, such as controlling/managing communication and/or packet transferring for relay network nodes, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 6G networks and development of 5G such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the RAN of an EPS has an essentially "flat" architecture comprising radio network nodes connected directly to one or more core networks.

With the 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

FIG. 1 discloses an overall architecture of a next generation RAN (NG-RAN).

The NG-RAN consists of a set of gNBs connected to the 5G core (5GC) through the NG interface.

NOTE: As specified in 38.300 v.15.6.0, NG-RAN could also consist of a set of ng-eNBs, an ng-eNB may consist of an ng-eNB-central unit (CU) and one or more ng-eNB-distributed units (DU). An ng-eNB-CU and an ng-eNB-DU is connected via W1 interface. The general principle described in this section also applies to ng-eNB and W1 interface, if not explicitly specified otherwise.

An gNB can support frequency division duplex (FDD) mode, time division duplex (TDD) mode or dual mode operation. gNBs can be interconnected through the Xn interface.

A gNB may consist of a gNB-CU and one or more gNB-DU(s). A gNB-CU and a gNB-DU is connected via F1 interface. One gNB-DU is connected to only one gNB-CU.

NOTE: In case of network sharing with multiple cell ID broadcast, each Cell Identity (ID) associated with a subset of public land mobile networks (PLMN) corresponds to a gNB-DU and the gNB-CU it is connected to, i.e., the corresponding gNB-DUs share the same physical layer cell resources.

NOTE: For resiliency, a gNB-DU may be connected to multiple gNB-CUs by appropriate implementation.

NG, Xn and F1 are logical interfaces.

For NG-RAN, the NG and Xn-C interfaces for a gNB consisting of a gNB-CU and gNB-DUs, terminate in the gNB-CU. For E-UTRAN New Radio-Dual Connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB. A possible deployment scenario is described in Annex A.

The node hosting user plane part of NR PDCP, e.g., gNB-CU, gNB-CU-UP, and for EN-DC, MeNB or SgNB depending on the bearer split, shall perform user inactivity monitoring and further informs its inactivity or (re)activation to the node having C-plane connection towards the core network, e.g., over E1, X2. The node hosting NR radio link control (RLC), e.g., gNB-DU, may perform user inactivity monitoring and further inform its inactivity or (re)activation to the node hosting control plane, e.g. gNB-CU or gNB-CU-control plane (CP).

UL Packet Data Convergence Protocol (PDCP) configuration (i.e. how the UE uses the UL at the assisting node) is indicated via X2-C (for EN-DC), Xn-C (for NG-RAN) and F1-C. Radio Link Outage/Resume for DL and/or UL is indicated via X2-U (for EN-DC), Xn-U (for NG-RAN) and F1-U.

The NG-RAN is layered into a Radio Network Layer (RNL) and a Transport Network Layer (TNL).

The NG-RAN architecture, i.e. the NG-RAN logical nodes and interfaces between them, is defined as part of the RNL.

For each NG-RAN interface (NG, Xn, F1) the related TNL protocol and the functionality are specified. The TNL provides services for user plane transport, signalling transport.

In NG-Flex configuration, each NG-RAN node is connected to all Access and Mobility Management Functions (AMF) of AMF Sets within an AMF Region supporting at least one slice also supported by the NG-RAN node. The AMF Set and the AMF Region are defined in 3GPP TS 23.501 v.15.6.0.

If security protection for control plane and user plane data on TNL of NG-RAN interfaces has to be supported, NDS/IP 3GPP TS 33.501 shall be applied.

FIG. 2 shows an overall architecture for separation of gNB-CU-control plane (CP) and gNB-CU-user plane (UP).

A gNB may consist of a gNB-CU-CP, multiple gNB-CU-UPs and multiple gNB-DUs;

The gNB-CU-CP is connected to the gNB-DU through the F1-C interface;

The gNB-CU-UP is connected to the gNB-DU through the F1-U interface;

The gNB-CU-UP is connected to the gNB-CU-CP through the E1 interface;

One gNB-DU is connected to only one gNB-CU-CP;

One gNB-CU-UP is connected to only one gNB-CU-CP;

NOTE 1: For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP;

One gNB-CU-UP can be connected to multiple DUs under the control of the same gNB-CU-CP;

NOTE 2: The connectivity between a gNB-CU-UP and a gNB-DU is established by the gNB-CU-CP using Bearer Context Management functions.

NOTE 3: The gNB-CU-CP selects the appropriate gNB-CU-UP(s) for the requested services for the UE. In case of multiple CU-UPs they belong to same security domain as defined in TS 33.210 v.15.6.0.

NOTE 4: Data forwarding between gNB-CU-UPs during intra-gNB-CU-CP handover within a gNB may be supported by Xn-U.

F1-AP is specified in TS 38.473 v.15.6.0.

E1 is specified in TS 38.463 v.15.6.0.

Protocol and architecture overview of Integrated Access Backhaul (IAB) Networks.

3GPP is currently standardizing integrated access and wireless access backhaul in NR (IAB) in Rel-17.

The usage of short range mmWave spectrum in NR creates a need for densified deployment with multi-hop backhauling. However, optical fiber to every base station will be too costly and sometimes not even possible, e.g., historical sites. The main IAB principle is the use of wireless links for the backhaul, instead of fiber, to enable flexible and very dense deployment of cells without the need for densifying the transport network. Use case scenarios for IAB can include coverage extension, deployment of massive number of small cells and fixed wireless access (FWA), e.g., to residential/office buildings. The larger bandwidth available for NR in mmWave spectrum provides opportunity for self-backhauling, without limiting the spectrum to be used for the access links. On top of that, the inherent multi-beam and multiple input multiple output (MIMO) support in NR reduce cross-link interference between backhaul and access links allowing higher densification.

During the study item phase of the IAB work, summary of the study item can be found in the technical report TR 38.874 v.15.6.0, it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

The specifications for IAB strive to reuse existing functions and interfaces defined in NR. In particular, MT, gNB-DU, gNB-CU, UPF, AM F and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality, such as multi-hop forwarding, is included in the architecture discussion as it is necessary for the understanding of IAB operation and since certain aspects may require standardization.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 3 shows a reference diagram for IAB in standalone mode in a high-level architectural view of an IAB network, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in the FIGS. 4 and 5.

The chosen protocol stacks reuse the current CU-DU split specification in rel-15, where the full user plane F1-U (GTP-U/UDP/IP) is terminated at the IAB access node, like a normal DU, i.e., the IAB node to which a UE is connected, and the full control plane F1-C (F1-AP/SCTP/IP) is also terminated at each IAB node, like a normal DU. In the above cases, Network Domain Security (NDS) has been employed to protect both UP and CP traffic, IP security (IPsec) in the case of UP, and Datagram Transport Layer Security (DTLS) in the case of CP. IPsec could also be used for the CP protection instead of DTLS, in this case no DTLS layer would be used.

A new protocol layer called Backhaul Adaptation Protocol (BAP) has been introduced in the IAB nodes and the IAB donor, which is used for routing of packets to the appropriate downstream or upstream node and also mapping the UE bearer data to the proper backhaul RLC channel, and also between ingress and egress backhaul (BH) RLC channels in intermediate IAB nodes, to satisfy the end to end quality of service (QoS) requirements of bearers. Therefore, the BAP layer is in charge of handling the BH RLC channel, e.g., to map an ingress BH RLC channel from a parent or child IAB node to an egress BH RLC channel in the link towards a child or parent IAB node.

In particular, one BH RLC channel may convey end-user traffic for several data radio bearers (DRB) and for different UEs which could be connected to different IAB nodes in the network. In 3GPP two possible configurations of BH RLC channel have been provided, i.e. a 1:1 mapping between BH RLC channel and a specific user's DRB, a N:1 bearer mapping where N DRBs possibly associated to different UEs are mapped to 1 BH RLC channel. The first case can be easily handled by the IAB node's scheduler since there is a 1:1 mapping between the QoS requirements of the BH RLC channel and the QoS requirements of the associated DRB. However, this type of 1:1 configuration is not easily scalable in case an IAB node is serving many UEs/DRBs. On the other hand, the N:1 configuration is more flexible/scalable, but ensuring fairness across the various served BH RLC channels might be trickier, because the amount of DRBs and/or UEs served by a given BH RLC channel might be different from the amount of DRBs and/or UEs served by another BH RLC channel.

On the IAB-node, also referred to as relay node, the BAP sublayer contains one BAP entity at the MT function and a separate collocated BAP entity at the DU function as shown in FIGS. 2 and 3. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

The BAP layer accomplishes several functions such as:

- Transfer of data;
- Routing of packets to next hop;
- Determination of BAP destination and BAP path for packets from upper layers such as layers 5-7;
- Determination of egress BH RLC channels for packets routed to next hop;
- Differentiating traffic to be delivered to upper layers from traffic to be delivered to egress link;
- Flow control feedback signalling;
- BH radio link failure (RLF) indication.

Therefore, the BAP layer is fundamental to determine how to route a received packet. For the downstream user plane data, that implies determining whether the packet has reached its final destination, in which case the packet will be transmitted to UEs that are connected to this IAB node, or to forward it to another IAB node in the right path. In the first case, the BAP layer passes the packet to higher layers in the IAB node which higher layers are in charge of mapping the packet to the various QoS flows and hence DRBs which are included in the packet. In the second case, instead, the BAP layer determines the proper egress BH RLC channel on the basis of the BAP destination, path IDs and ingress BH RLC channel. Same as the above applies also to the upstream, with the only difference that the final destination is always one specific donor DU/CU. In order to achieve the above tasks, the BAP layer of the IAB node has to be configured with a routing table mapping ingress RLC channels to egress RLC channels which may be different depending on the specific BAP destination and path of the packet. Hence, the BAP destination and path ID are included in the header of the BAP packet so that the BAP layer can determine where to forward the packet.

Additionally, the BAP layer has an important role in the hop-by-hop flow control. In particular, a child node can inform the parent node about possible congestions experienced locally at the child node, so that the parent node can throttle the traffic towards the child node. The parent node can also use the BAP layer to inform the child a node in case of RLF issues experienced by the parent, so that the child can possibly reestablish its connection to another parent node.

Packet Routing at BAP Layer.

As discussed in the above section, the IAB node uses the information contained in the BAP header, such as the BAP destination and the BAP path ID, to determine if the received packet has reached its final destination, or if that should be routed to another node. In particular, in case the packet has not received the final BAP destination, the IAB node has to match the information contained in the BAP header with the BAP mapping configuration which contains the BH routing information from which the IAB node can retrieve the next hop to which the concerned BAP packet should be transmitted and the BH RLC channel.

The Rel.16 BAP data PDU format is illustrated in FIG. 6. The BAP PDU currently consists of a BAP header, containing a D/C field, three "R" reserved fields, one DESTINATION field, one PATH field, and the Data.

The DESTINATION field carries the BAP address of the destination IAB-node or IAB-donor-DU.

The PATH field carries the BAP path identity.

The R fields are reserved. In this version of the specification reserved bits shall be set to 0. Reserved bits shall be ignored by the receiver.

The D/C field indicates whether the corresponding BAP PDU is a BAP Data PDU or a BAP Control PDU.

From a functional perspective, the receiving part of the BAP entity of an IAB node needs to inspect the BAP packet to determine how to forward the packet. If the packet has reached its final destination, i.e., the IAB node is the destination node for this packet, the BAP entity removes the BAP header and it passes it to the upper layers of the IAB node. The received packet can either be a F1-U packet or an F1-C packet. If it is an F1-U packet it contains user plane data for the access UEs connected to the IAB node. The UE DRBs are encapsulated in a GPRS Tunneling protocol (GTP)/User Datagram Protocol (UDP)/IP packet and the upper layer will disassemble the GTP packet and determine to which UE and/or DRB such packet should be transmitted, see FIG. 4. If it is a F1-C packet the message is carried the F1AP encapsulated with stream control transmission protocol (SCTP) and/or IP. The F1AP message can carry BAP configuration or IAB-node DU configuration. It can also carry radio resource control (RRC) messages for the access UEs or for the child MT. In the case of that the F1AP carries RRC messages they are sent to the IAB node DU to be allocated to signalling radio bearers (SRB) for either the access UEs or child MT(s), see FIG. 5. Otherwise, if the packet has not reached its final destination, the receiving BAP entity will pass the packet to transmitting part of the BAP sublayer which in turn will decide where to route the packet on the basis of the configured routing table. TS 38.340 specifies two methods for the receiving part of the BAP sublayer to interact with to the transmitting part when passing the BAP packet:

1. The receiving part on the BAP entity delivers BAP PDUs to the transmitting part on the collocated BAP entity, without stripping off the BAP header, i.e. the receiving part transmits the BAP PDU to the transmitting part as it was received without modifying it.

2. Alternatively, the receiving part may deliver BAP SDUs to the collocated transmitting part. When passing BAP SDUs, the receiving part removes the BAP header and the transmitting part adds the BAP header with the same BAP routing ID as carried on the BAP PDU header prior to removal. This method implies that the BAP header is stripped-off by the receiving part so that the receiving part passes the BAP SDU to transmitting part.

On the other hand, the transmitting part of the BAP entity can receive data from upper layers, i.e. in case the BAP entity is hosted in an IAB donor node, or by the receiving part of the BAP entity. In case the BAP packet does not have the BAP header, e.g. in case a BAP service data unit (SDU) is received from upper layers or from the receiving part of this BAP entity upon stripping-off the BAP header, as mentioned above in bullet 2, the transmitting part will construct the BAP protocol data unit (PDU), i.e., it will add the DESTINATION field corresponding to the BAP address and the PATH field corresponding to the BAP path identity.

When the BAP entity has a BAP Data PDU to transmit, the transmitting part of the BAP entity shall:

perform routing to determine the egress link on the basis of the BH Routing Configuration provided by the CU;

determine the egress BH RLC channel on the basis of the BH RLC Channel Mapping Configuration provided by the CU;

submit this BAP Data PDU to the selected egress BH RLC channel of the selected egress link.

The interaction between the transmitting and receiving part is illustrated in FIG. 7.

An IAB node will also handle BAP control PDU. Unlike the handling of the BAP data PDU described above, the BAP control PDU is not forwarded to multiple hops in Rel.16, rather that can only be transmitted from the child to the parent node or from the parent node to the child. The BAP control PDU is in the current specification just used for flow control purposes between child node and parent node, and for BH RLF indication transmitted by the parent node to the child node to indicate RLF experienced by the parent node in one egress link in the uplink direction.

Two examples of BAP control PDUs are depicted in FIG. 8 and FIG. 9. Other possible BAP control PDUs have been specified in TS 38.340 v.16.0.0.

SUMMARY

According to the existing TS 38.340 v.16.0.0, when a BAP PDU is received by an IAB node and this BAP PDU contains reserved or invalid values or contains a BAP address which is not included in the configured BH Routing Configuration and is not the BAP address of this node, the BAP entity shall discard the received BAP PDU. Therefore, the scenario of an IAB node receiving a BAP PDU containing reserved or invalid values is seen as an error case, and the receiving IAB node shall discard it in order to avoid to unnecessarily forward such packet to other IAB nodes, since also such other IAB nodes present in the network will not be able to decode the BAP header.

However, in case 3GPP agrees to enhance the BAP header in future releases, it can happen that some of the "new" IAB nodes which are compliant with this new 3GPP release can adopt this new BAP header, whereas the "old" IAB nodes which are not compliant with this new 3GPP release will not be able to comprehend this new BAP header. In particular, the "old" IAB node will interpret the BAP PDU as "containing reserved values" in case any of the "R" field in the header is set. On the other hand, the IAB node will interpret the BAP PDU as "containing unknown values" in case the BAP header contains any new field not specified in the BAP header format of FIG. 6.

If the IAB network consists of mixture of IAB nodes which are compliant to different 3GPP releases, it can happen that some of the "new" IAB node sets a certain new field in the BAP header or uses a field which was reserved in a previous release of the BAP header format. When the BAP PDU with such header is received by any "old" IAB node, such BAP PDU cannot be decoded, and hence according to the current specification the BAP PDU will be discarded. Therefore, in this case, the scenario of an IAB node receiving a BAP PDU containing reserved or invalid values should not be seen as an error case, rather as a scenario that may occur in this type of network deployment where the IAB nodes of different releases may forward packets to each other.

For example, as illustrated in FIG. 10, the "new" IAB node 1 could set some of the new fields in the new BAP header of a certain BAP PDU packet destined to the "new" IAB node 3, i.e. the "new" IAB node 3 is the destination node for this BAP PDU. Such new fields may be decoded by the "new" IAB node 3, but not by the "old" IAB node 2. Hence, when the "old" IAB node 2 receives such a BAP PDU, it will unnecessarily discard it according to the current legacy specification, even though the packet is destined to the "new" IAB node 3.

Since the whole BAP PDU will be discarded, such behavior may result in data losses, and also in control information losses. In fact, the BAP header of the BAP data PDU may also contain control information that could be used by other IAB nodes in the network or by the donor IAB node DU/CU. Such information contained in the BAP header will also be lost.

The above described issue affects both the upstream and downstream.

An object herein is to provide a mechanism to enable communication, e.g. handle or manage communication of PDUs, in an efficient manner in a wireless communications network.

According to an aspect the object is achieved, according to embodiments herein, by providing a method performed by a first network node such as an IAB node of an early release, for handling or managing communication in a wireless communications network. The first network node receives a data packet with a header comprising an indicated destination, with a BAP address, and one or more values interpreted by the first network node as reserved or unknown. The first network node checks whether the first network node is an intended destination of the data packet based on the indicated destination in the header. With the proviso that the first network node is not the intended destination of the data packet and the BAP address is not included in a configured BH routing configuration, the first network node discards the data packet. Else, the first network node processes the data packet. For example, the first network node processes the data packet if the BAP address is included in the configured BH routing configuration.

According to another aspect the object is achieved, according to embodiments herein, by providing a method performed by a second network node such as an IAB node of a late release, for handling or managing communication in a wireless communications network. The second network node determines whether another network node is compliant or not with a release of a specification to which the second network node is compliant. The second network node then handles a data packet intended for the other network node based on whether it is determined that the other network node is compliant or not with the release of the specification to which the second network node is compliant.

According to yet another aspect the object is achieved by a method performed by a control network node such as a donor or an OAM node, for handling or managing communication in a wireless communications network. The control network node configures IAB nodes such that the space of known fields can be comprehended by all the hosted IAB nodes.

According to an aspect the object is achieved, according to embodiments herein, by providing a first network node, a second network node, and a control network node configured to perform the methods herein, respectively.

Thus, it is herein provided a first network node such as an IAB node of an early release, for handling or managing communication in a wireless communications network. The first network node is configured to receive a data packet with a header comprising an indicated destination, with a BAP address, and one or more values interpreted by the first network node as reserved or unknown. The first network node is configured to check whether the first network node is an intended destination of the data packet based on the indicated destination in the header. With the proviso that the first network node is not the intended destination of the data packet and the BAP address is not included in a configured BH routing configuration, the first network node is configured to discard the data packet. Else, the first network node is configured to process the data packet. For example, the first network node is configured to process the data packet if the BAP address is included in the configured BH routing configuration.

According to still another aspect the object is achieved, according to embodiments herein, by providing a second network node such as an IAB node of a late release, for handling or managing communication in a wireless communications network. The second network node is configured to determine whether another network node is compliant or not with a release of a specification to which the second network node is compliant. The second network node is configured to then handle a data packet intended for the other network node based on whether it is determined that the other network node is compliant or not with the release of the specification to which the second network node is compliant.

According to yet another aspect the object is achieved by a control network node such as a donor or an OAM node, for handling or managing communication in a wireless communications network. The control network node is configured to configure IAB nodes such that the space of known fields can be comprehended by all the hosted IAB nodes.

It is furthermore provided herein a computer program product comprising instructions, which, when executed on at least one processor, cause the at least one processor to carry out the method above, as performed by the first network node, the second network node, and the control network node, respectively. It is additionally provided herein a computer-readable storage medium, having stored thereon a computer program product comprising instructions which, when executed on at least one processor, cause the at least one processor to carry out the method according to the method above, as performed by the first network node, the second network node, and the control network node.

Embodiments herein provide one or more network nodes such as an IAB node to avoid discarding unnecessarily a PDU when its header contains values which appear as reserved or unknown to the concerned network node. Therefore, the advantage of embodiments herein is to avoid discarding packets whenever that is not needed. This implies reduced losses of data and control information contained in the BAP header and which are traversing an IAB network. Thus, embodiments herein enable a reliable communication, e.g., handle or manage signalling, in an efficient manner in a wireless communications network.

BRIEF DESCRIPTION OF THE DRAWINGS

Embodiments will now be described in more detail in relation to the enclosed drawings, in which:

FIG. 20 shows a block diagram depicting embodiments of a first network node according to embodiments herein;

FIG. 21 shows a block diagram depicting embodiments of a second network node according to embodiments herein;

DETAILED DESCRIPTION

Figure 1:
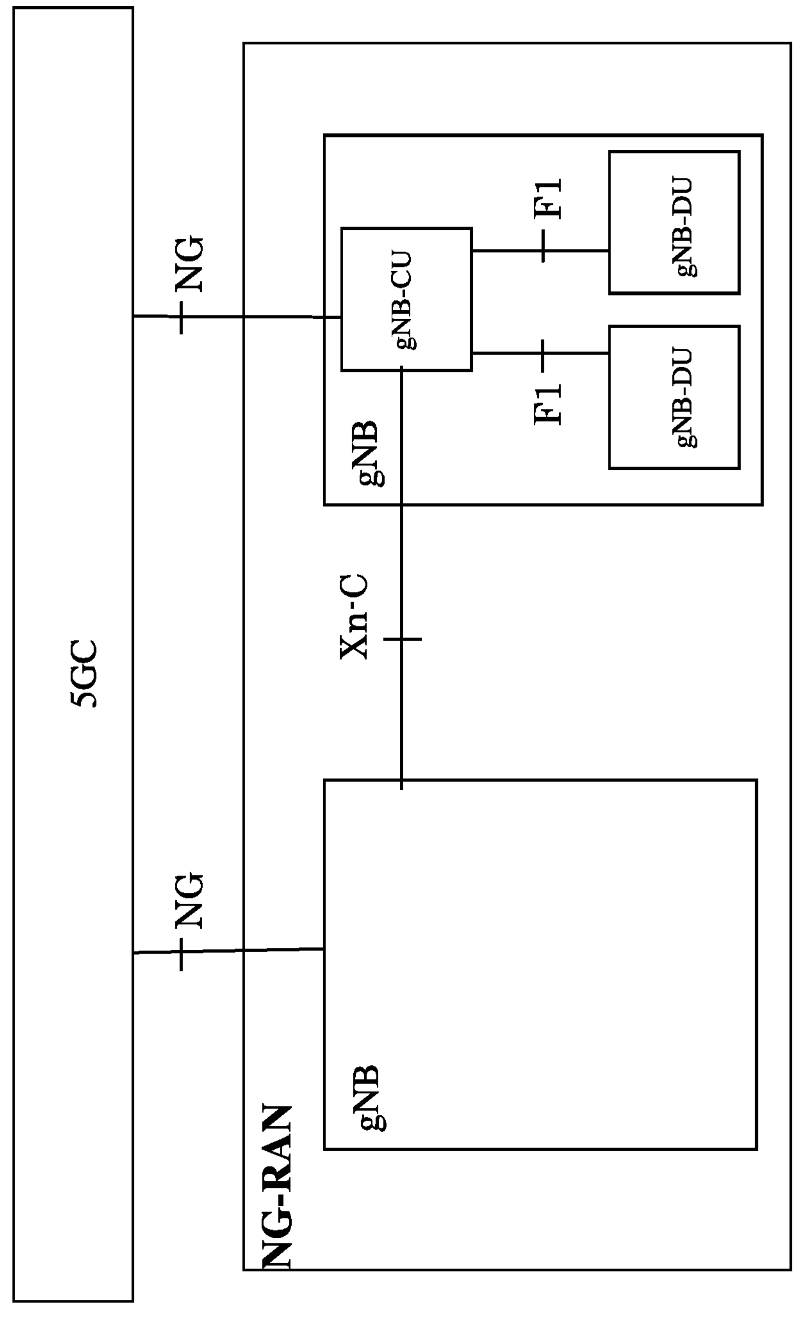
FIG. 1 shows a schematic network architecture according to prior art.
Figure 2:
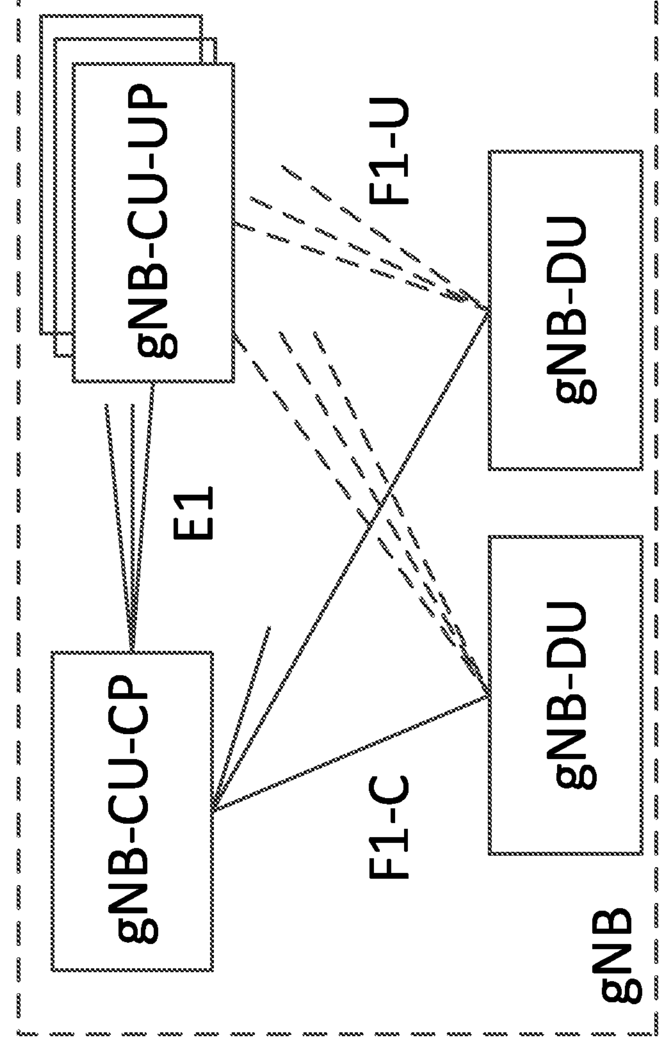
FIG. 2 shows an architecture according to prior art.
Figure 3:
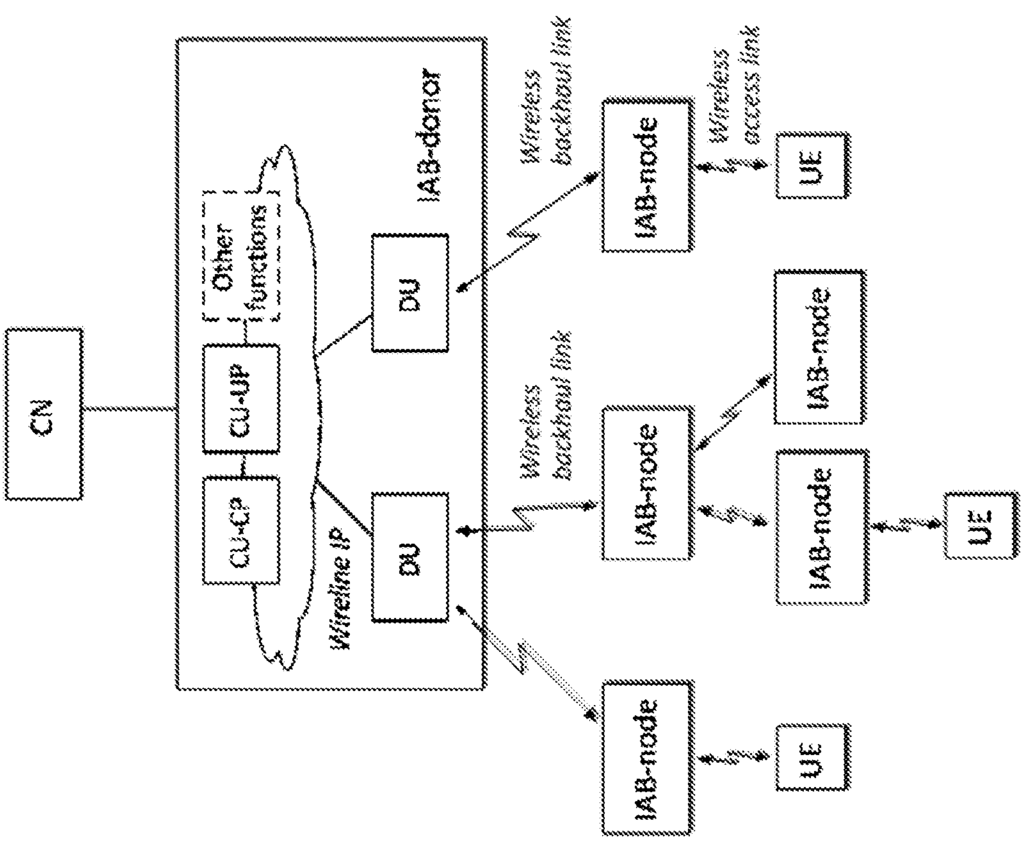
FIG. 3 shows a Reference diagram for IAB-architectures (TR 38.874)
Figure 4:
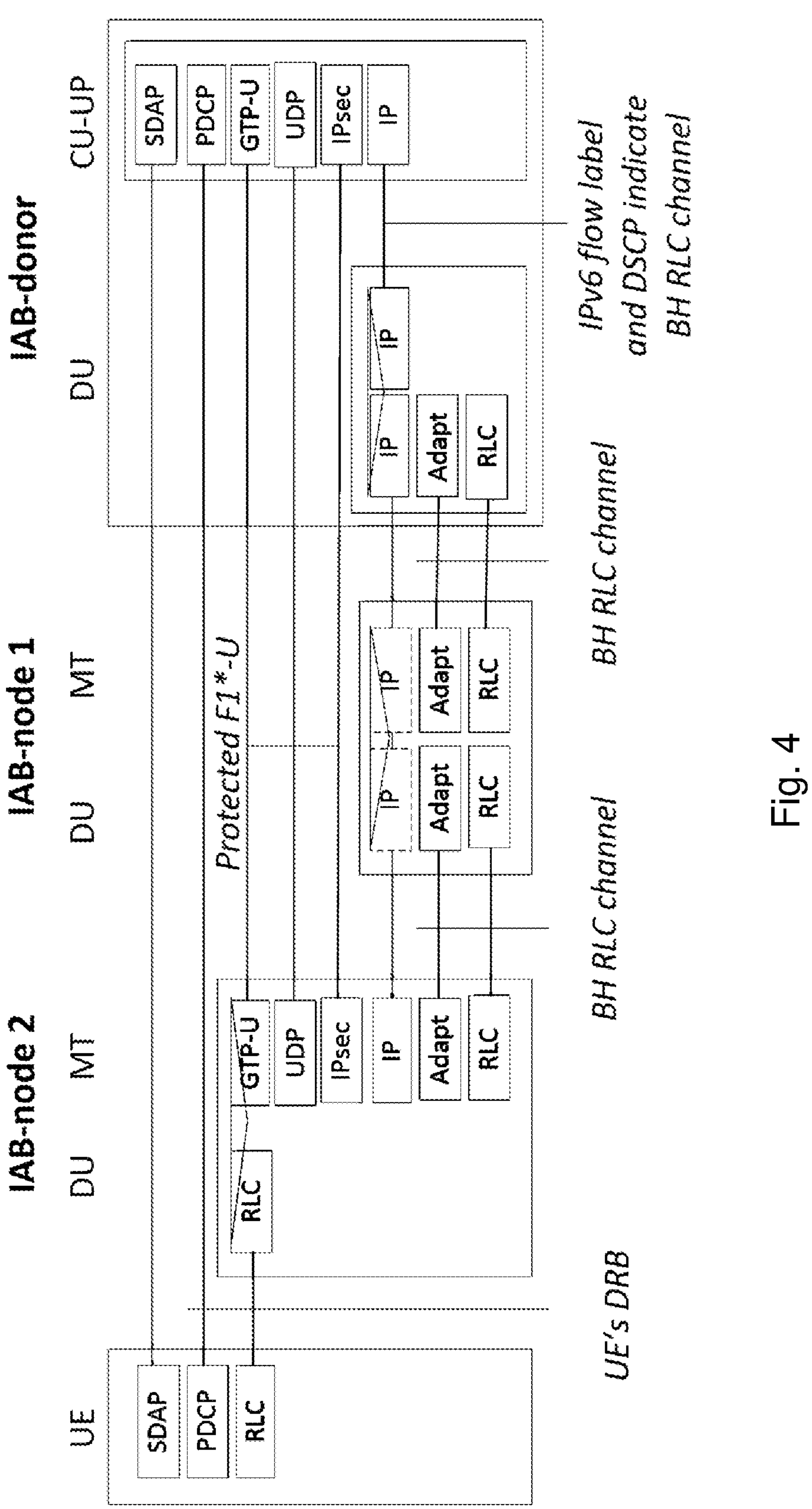
FIG. 4 shows protocol stacks according to prior art.
Figure 5:
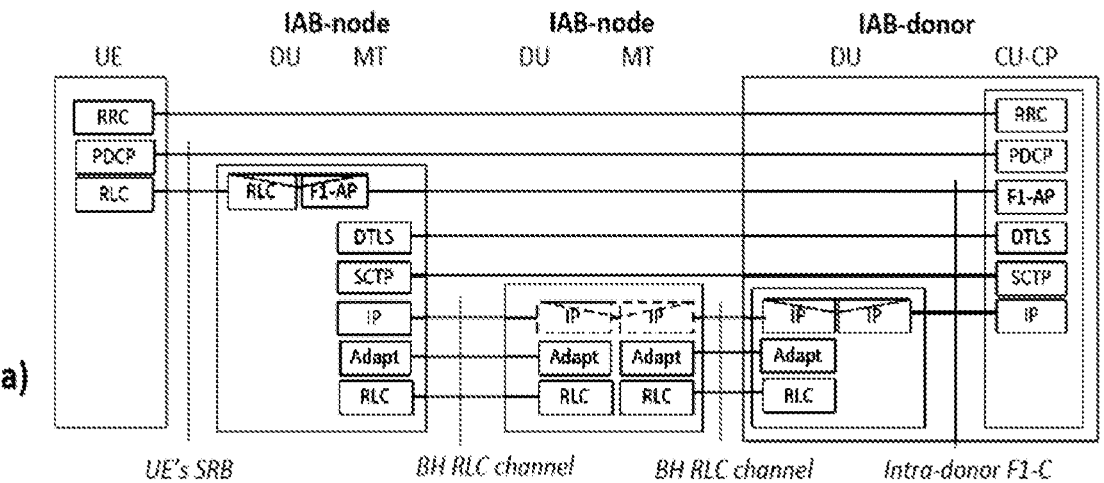
FIG. 5 shows protocol stacks according to prior art.
Figure 5:
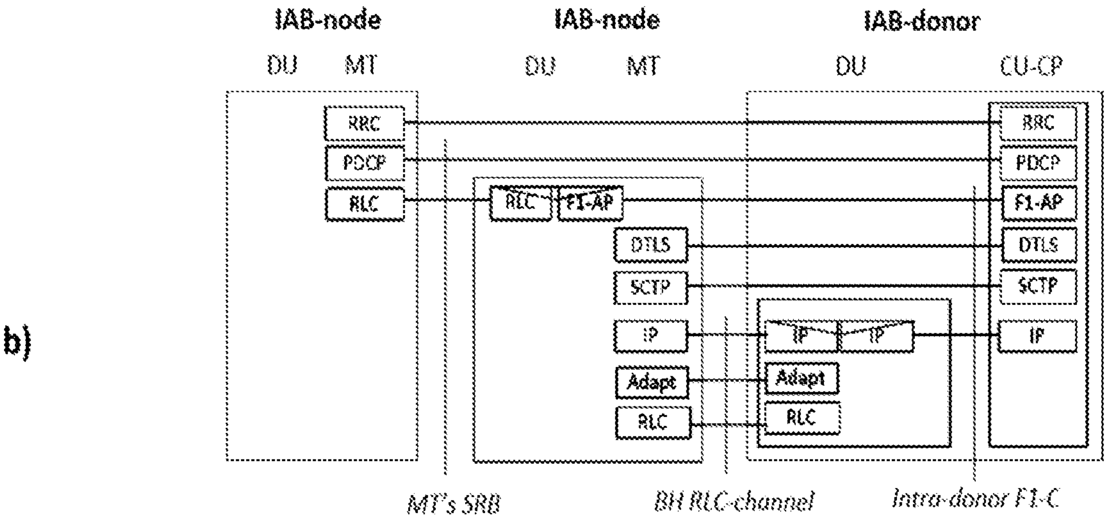
Figure 5:
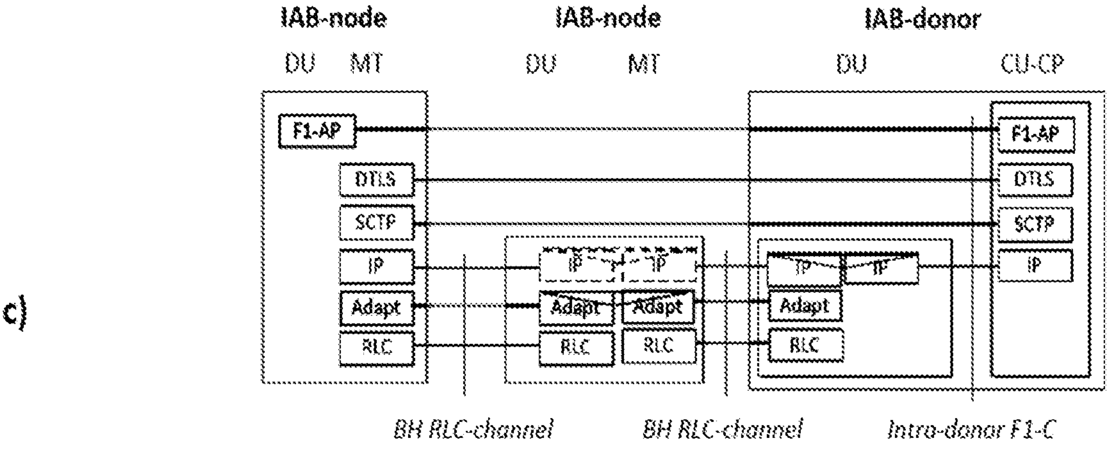
Figure 6:
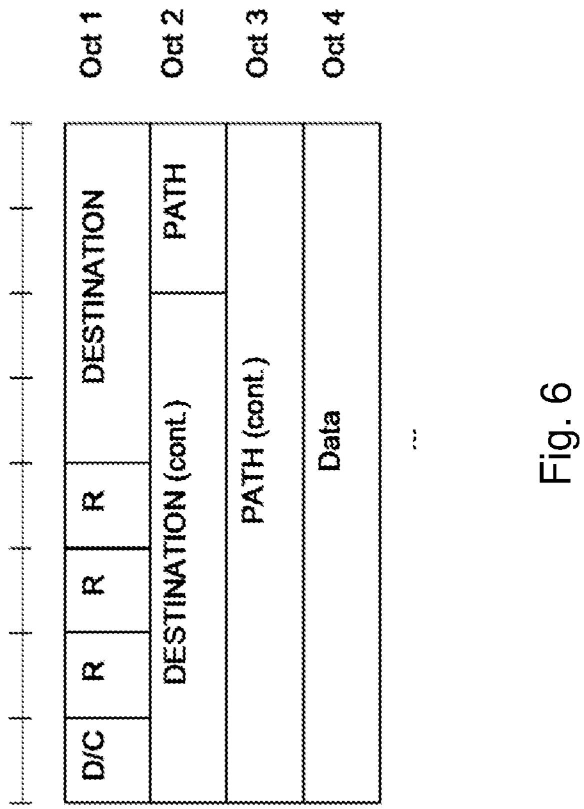
FIG. 6 shows Rel.16 BAP data PDU format with BAP header plus Data according to prior art.
Figure 7:
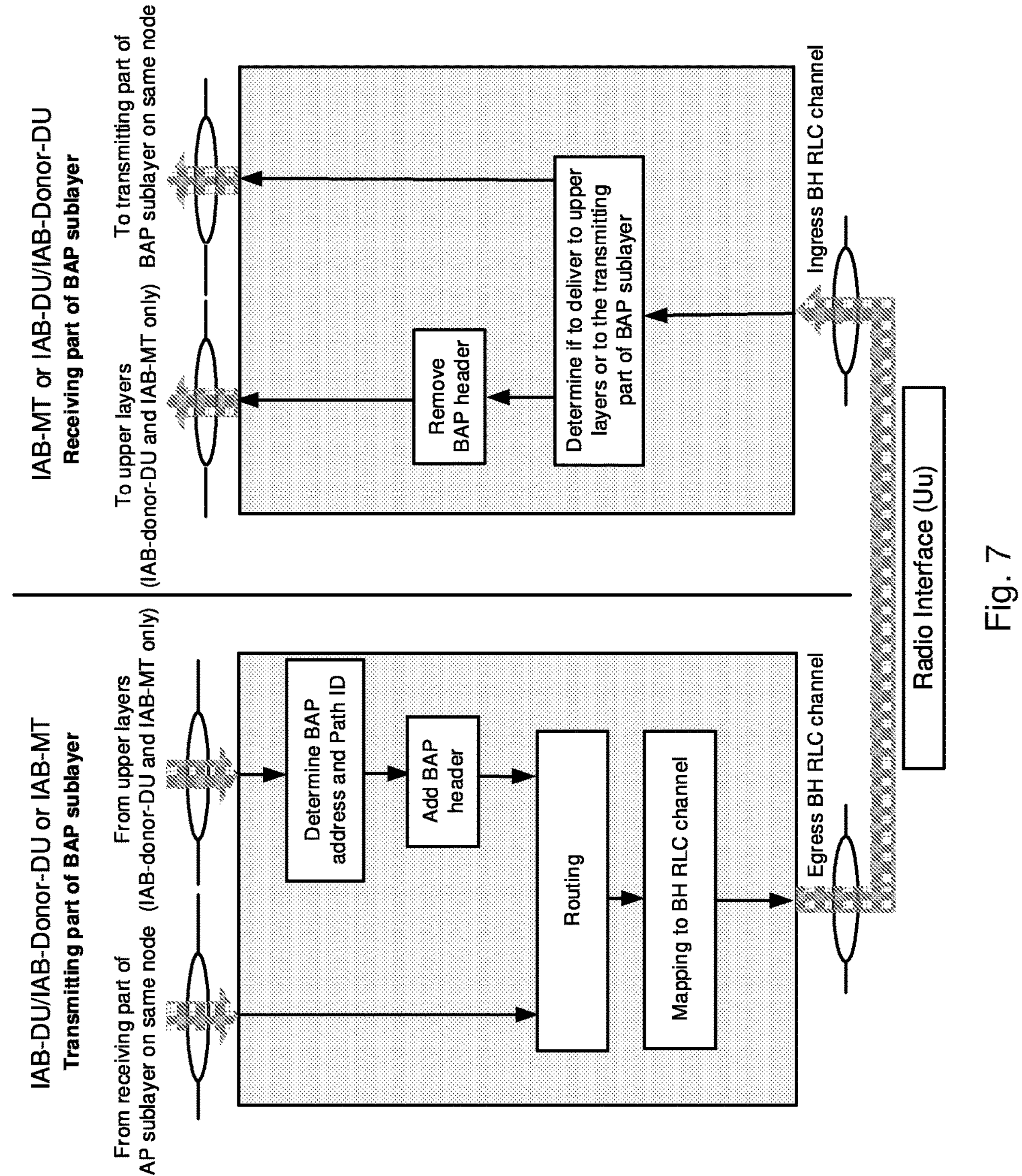
FIG. 7 shows a method for the transmitting part and receiving part of the BAP sublayer of one IAB node to interact between each other.
Figures 8, 9:
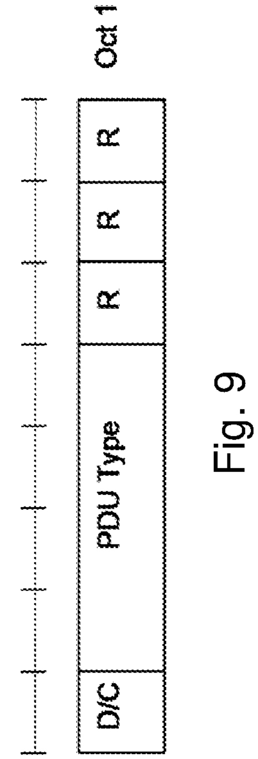
FIG. 8 shows a BAP Control PDU format for flow control feedback per BH RLC channel.
FIG. 9 shows a BAP Control PDU format for BH RLF indication.
Figure 10:
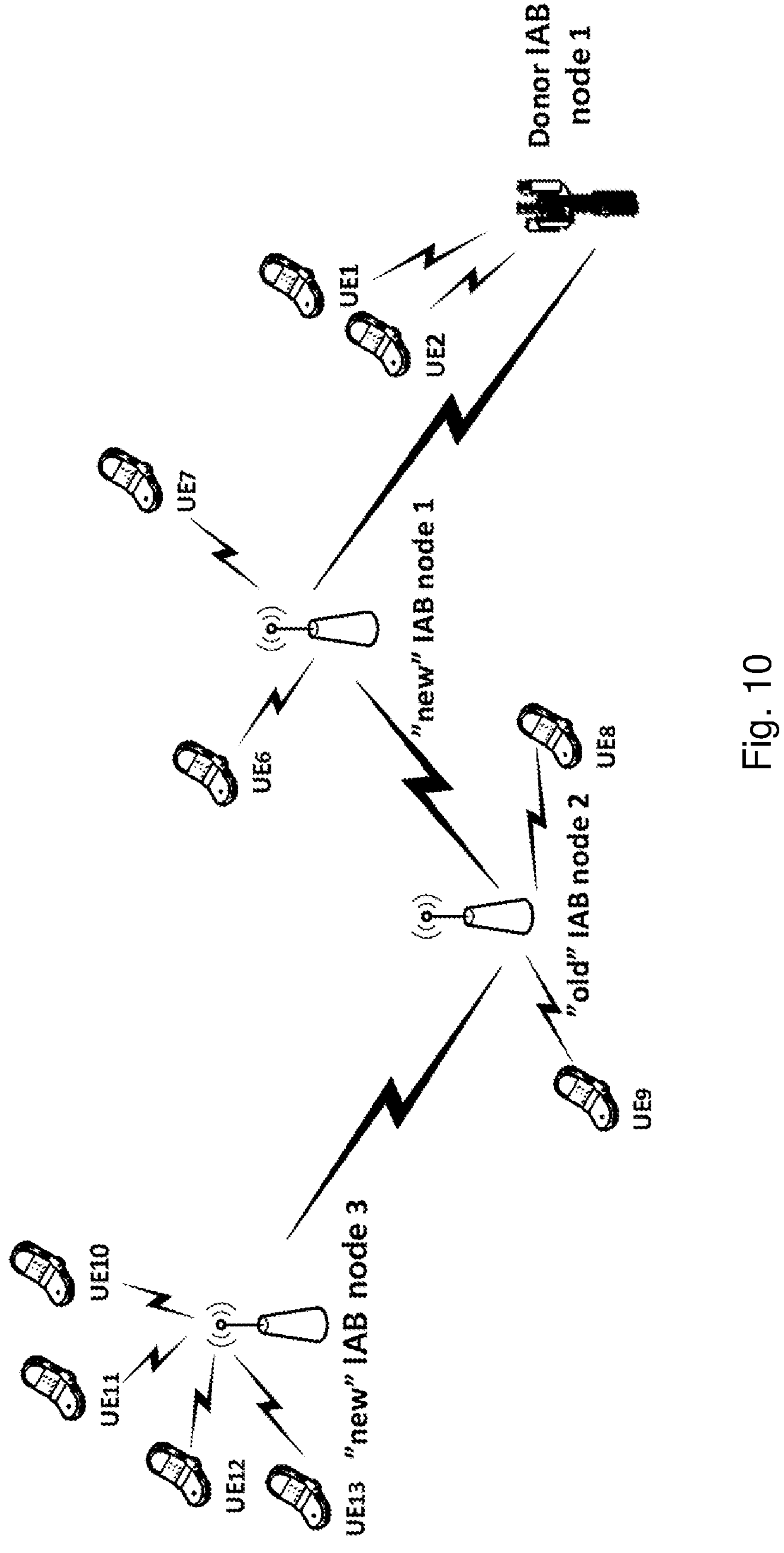
FIG. 10 shows an IAB network with IAB nodes of different releases communicating between each other.
Figure 11A:
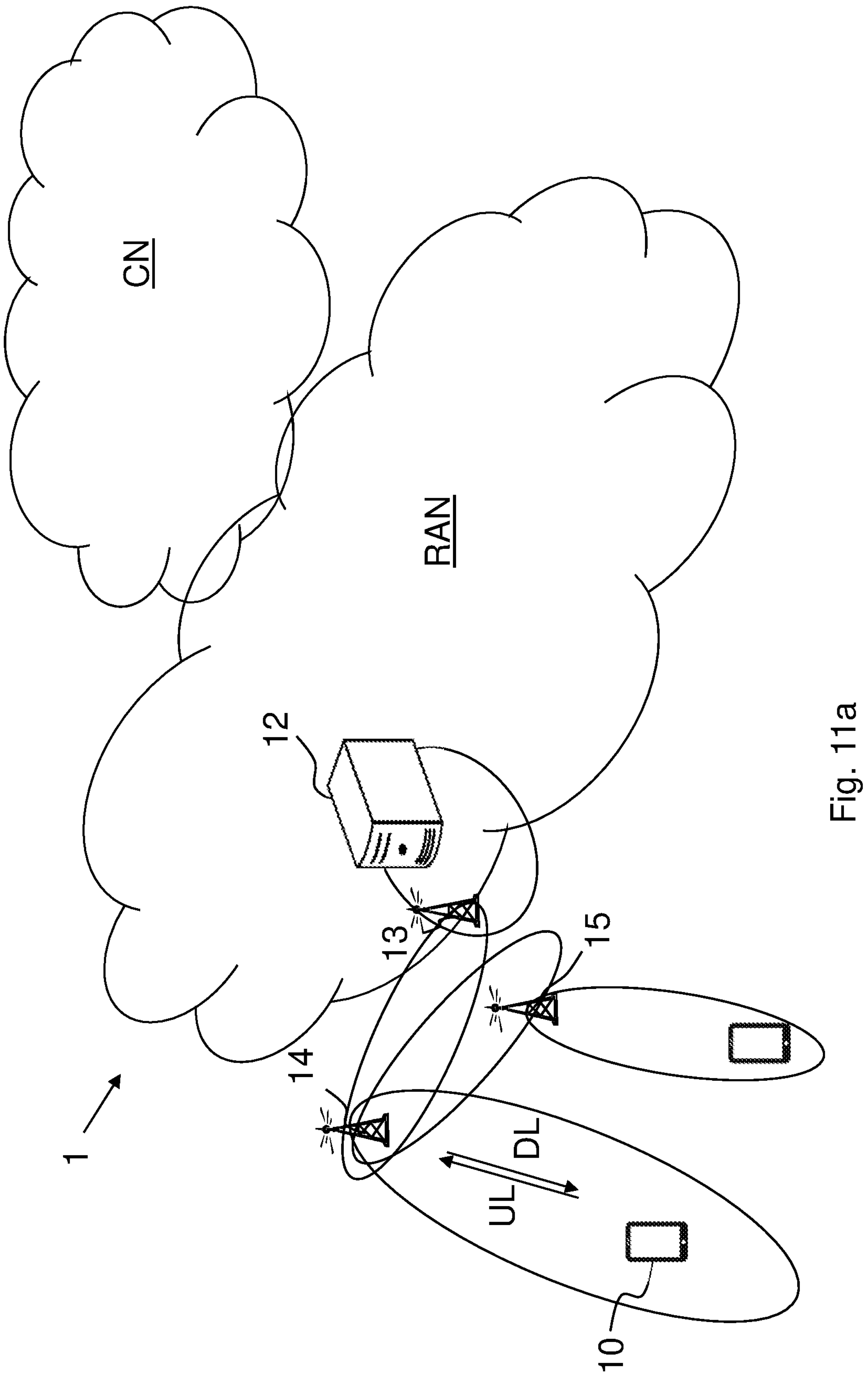
FIG. 11*a* shows an overview depicting a wireless communications network according to embodiments herein.

Embodiments herein relate to wireless communications networks in general. FIG. 11*a* is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 such as a mobile station, a wireless device, a non-access point (non-AP) STA, a STA, and/or a wireless terminal, is comprised communicating via e.g. one or more Access Networks (AN), e.g. RAN, to one or more core networks (CN). It should be understood by the skilled in the art that "UE" is a non-limiting term which means any terminal, wireless communications terminal, user equipment, Internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 e.g. an IAB node such as an IAB-donor node or an IAB-CU, baseband unit (BBU), an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point or any other network unit or node capable of communicating with a wireless device within a service area served by the radio network node depending e.g. on a first radio access technology and terminology used. The first radio network node 12 may also be referred to as serving or source node or RAN node. It should be noted that a service area may be denoted as cell, beam, beam group or similar to define an area of radio coverage. This first radio network node is also referred to herein as first network node.

The wireless communication network 1 further comprises a first intermediate radio network node 13 connected in-between the first radio network node 12 and the UE 10. The first intermediate radio network node 13 may be an IAB node such as an IAB-DU e.g. a radio remote unit (RRU), an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a first radio access technology and terminology used.

The wireless communication network further comprises a second intermediate radio network node, being an example of a first network node 14 according to embodiments herein, connected in-between the first radio network node 12 and the UE 10. The first network node 14 may be connected to the UE 10 directly and may be an egress/ingress point. The first network node 14 may be an IAB node e.g. a radio remote unit (RRU), an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a radio access technology and terminology used. It should be noted that a service area may be denoted as cell, beam, beam group or similar to define an area of radio coverage. This first network node 14 may be compliant with a first release version of the specification, e.g. an "old" IAB node.

The wireless communication network 1 may further comprise a third intermediate radio network node, being an example of a second network node 15, connected to the first network node 14, other network nodes, and/or to served UEs. The second network node 15 may be an IAB node e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a radio access technology and terminology used. It should be noted that a service area may be denoted as cell, beam, beam group or similar to define an area of radio coverage. This second network node 15 may be compliant with a second release version of the specification, e.g. a "new" IAB node. Thus, the first release version may be different than the second release version.

Embodiments herein aim to provide one or more solutions handling data packets of different release versions in the wireless communication network.

It should be noted that:

The terms "BAP PDU" may refer to either a "BAP data PDU" or a "BAP control PDU".

The terms "old" IAB node represents an IAB node compliant with a certain release X of the 3GPP specification and that interprets a received BAP PDU as "containing reserved values" or as "containing unknown values".

The IAB node interprets a received BAP PDU as "containing reserved values" in case the BAP header has set one or more of the fields which are reserved in the BAP header format of Release X.

The IAB node interprets a received BAP PDU as containing "unknown values" in case the BAP header contains one or more new fields which are not specified in the BAP header format of Release X.

The terms "new" IAB node represents an IAB node which is compliant with the release X and with a later release Y, i.e. it can decode one or more of the field that are interpreted as "Reserved" or "unknown" by the "old" IAB node.

The terms "gNB-CU" and "Donor-CU", "CU-CP" and "CU" are used interchangeably.

The term "gNB" applies to all variants therein, e.g. "gNB", "en-gNB" etc.

The term "IAB donor" refers to a gNB that provides network access to UEs via a network of backhaul and access links.

The term "Intermediate IAB node" refers to an IAB node with one or more ingress BH RLC channels and one or more egress BH RLC channels The term "IAB Access node" refers to an IAB node that provides an access link to UEs for a certain BAP PDU.

The term "IAB node" refers to any of "IAB donor", "Intermediate IAB node", "IAB Access node".

Figure 11B:
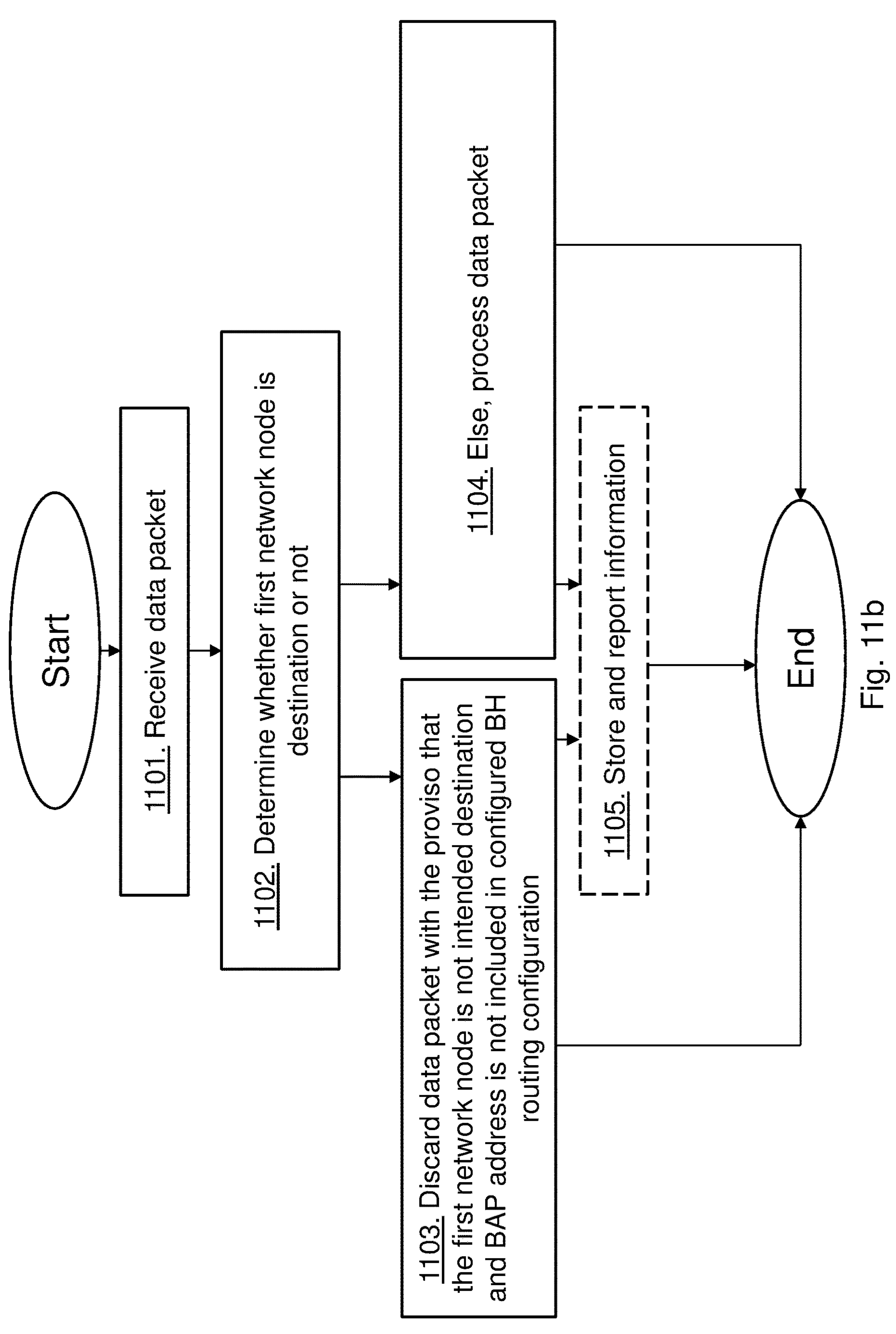
FIG. 11*b* shows a flowchart depicting a method performed by a first network node according to embodiments herein.

The method actions performed by the first network node 14, such as a first IAB node, for handling communication in the wireless communications network 1 according to embodiments herein will now be described with reference to a flowchart depicted in FIG. 11*b*. The actions do not have to be taken in the order stated below, but may be taken in any suitable order. Dashed boxes indicate optional features.

Action 1101. The first network node 14 receives a data packet with a header comprising an indicated destination, with a BAP address, and one or more values interpreted by the first network node 14 as reserved or unknown.

Action 1102. The first network node 14 checks whether the first network node 14 is an intended destination of the data packet based on the indicated destination in the header.

Action 1103. The first network node 14, with the proviso that the first network node 14 is not the intended destination of the data packet and the BAP address is not included in the configured BH routing configuration, discards the data packet.

Action 1104. Else, the first network node 14 processes the data packet. For example, the first network node, with the proviso that the first network node is intended as the destination of the data packet or the BAP address is included in the configured BH routing configuration, may process the data packet. Processing the data packet may comprise transmitting said data packet to the second network node of a next hop irrespective that the header comprises the one or more values interpreted by the first network node as reserved or unknown; or removing one or more octets of the header comprising the one or more reserved or invalid values; and sending a service data unit to upper layer.

Action 1105. The first network node 14 may store and report information related to the fact that first network node 14 received a packet data containing reserved or unknown values, to an IAB donor, an OAM node, or to the upper layers of the first network node 14.

Figure 12A:
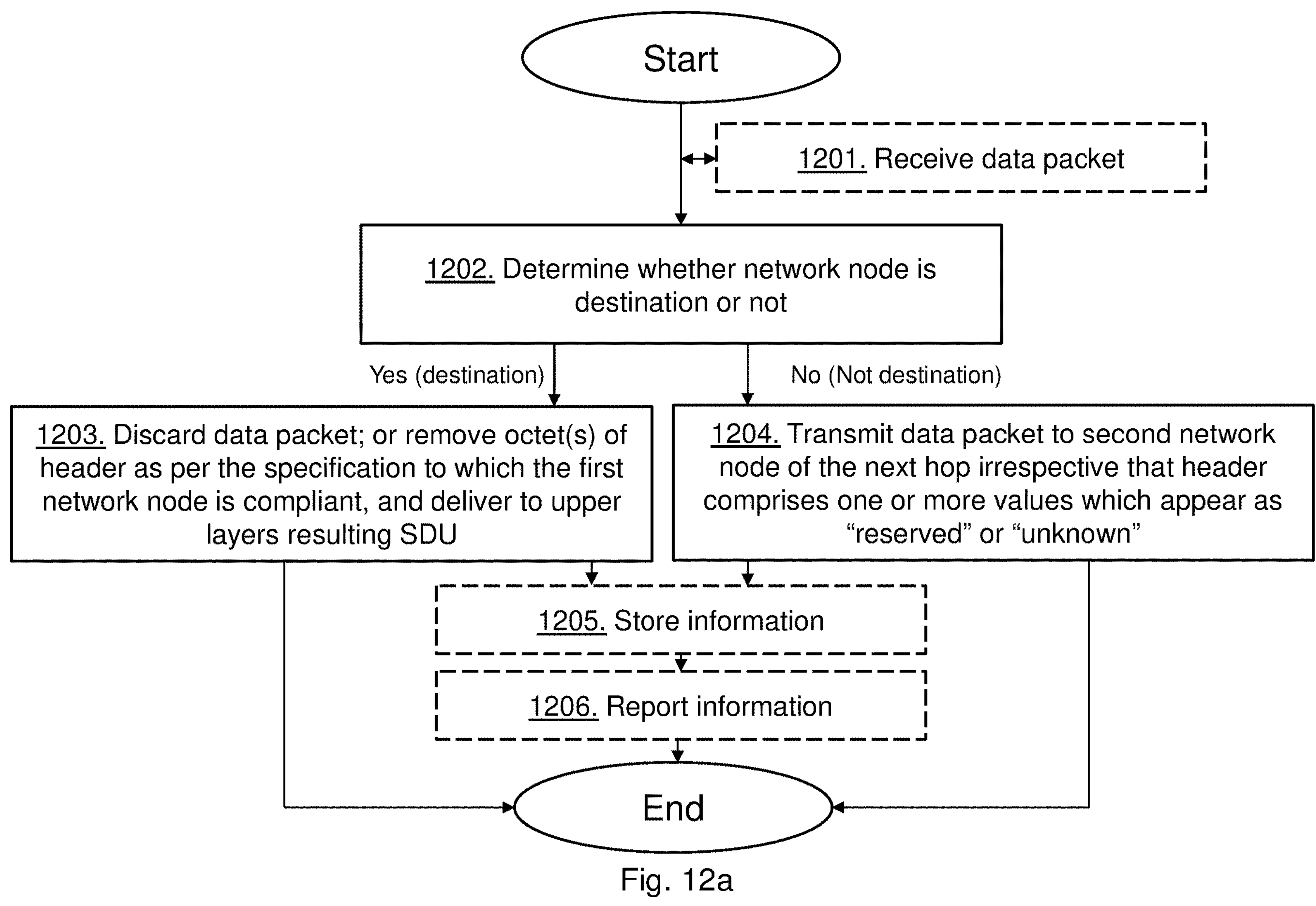
FIG. 12*a* shows another flowchart depicting a method performed by a first network node according to embodiments herein.

Method actions performed by the first network node 14, such as a first IAB node, for handling communication in the wireless communications network 1 will now be described with reference to a flowchart depicted in FIG. 12*a*. The actions do not have to be taken in the order stated below, but may be taken in any suitable order. Dashed boxes indicate optional features.

Action 1201. The first network node 14 may receive a data packet with a header (BAP header) from e.g. a parent network node or a child network node.

Action 1202. The first network node 14 determines or checks whether the first network node is an intended destination of the data packet. For example, determines whether said BAP PDU contains in its BAP header a BAP destination which matches the BAP address of this IAB node.

Action 1203. With the proviso that the first network node 14 is the intended destination of the data packet the first network node 14 may: discard the data packet if said data packet contains in its BAP header values which appear as "reserved" or "unknown" to the first network node; or remove from the data packet one or more octets of the data packet which appear to be part of the header as per the specification to which the first network node is compliant, and to deliver to upper layers a resulting SDU.

Action 1204. With the proviso that the first network node 14 is not the intended destination of the data packet the first network node 14 may: transmit said data packet to the second network node 15 such as a third IAB node of the next hop irrespective that the header comprises one or more values which appear as "reserved" or "unknown" to said first network node 14. For example, the first network node 14 may remove from the data packet the octets of the data packet which appear to be part of the header as per the specification to which the first network node 14 is compliant. Then the first network node 14 may store the above stripped header and deliver the resulting SDU and the stripped header to a transmitting part of the BAP entity. The first network node 14 may then append, at the transmitting part of the BAP entity, to the SDU the stripped header (or a new header which is identical (i.e. same values) to the stripped header). Hence the transmitting part may generate a BAP PDU.

Action 1205. The first network node 14 may store an information related to the fact that it received a packet data containing reserved or unknown values.

Action 1206. The first network node 14 may then report the information to an IAB donor, an operation, administration and maintenance (OAM) node, or to the upper layers of the first network node 14.

Figure 12B:
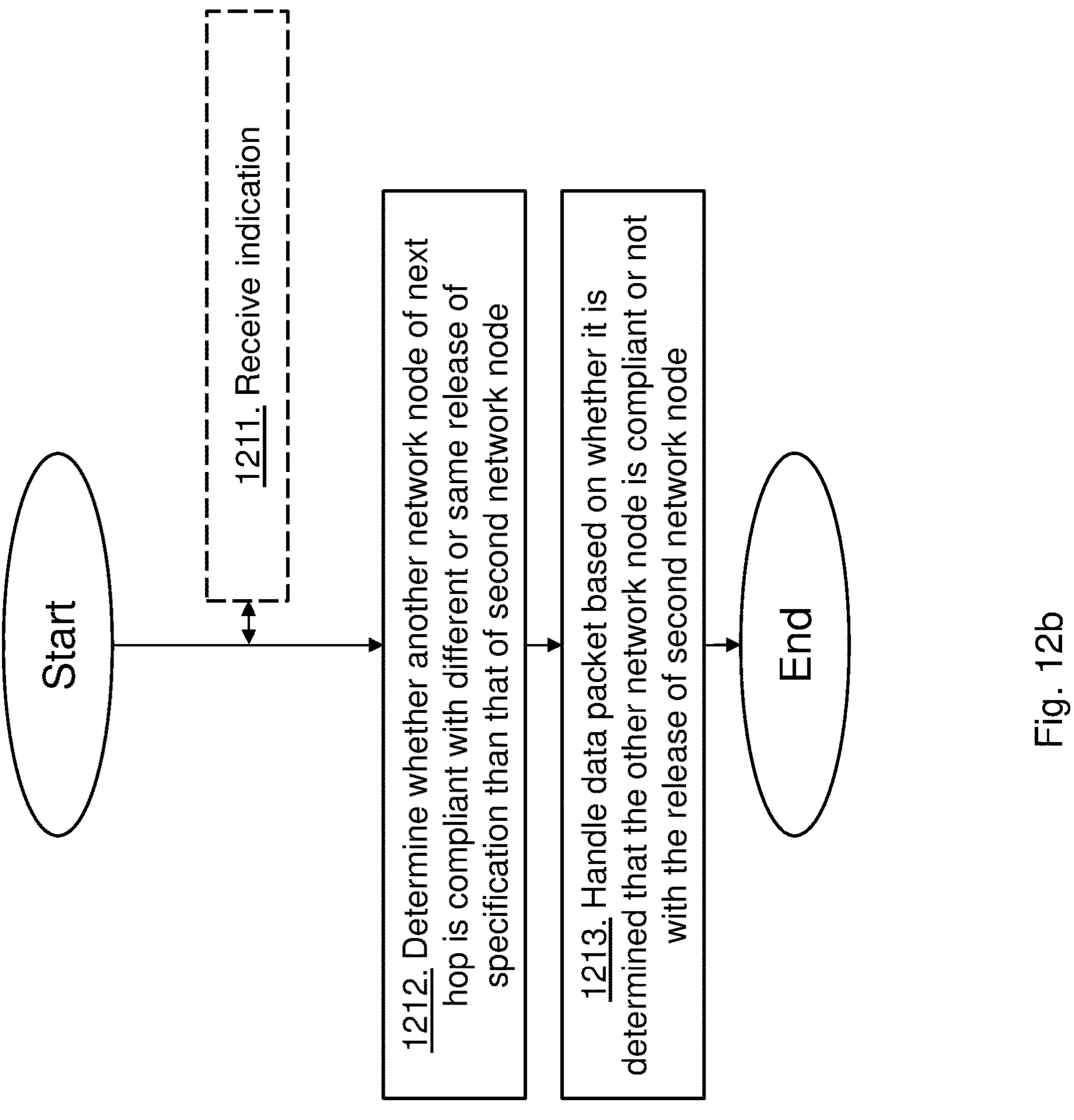
FIG. 12*b* shows a flowchart depicting a method performed by a second network node according to embodiments herein.

The method actions performed by the second network node 15, for example an IAB node such as an IAB node of a later release than the first network node 14, for handling communication in the wireless communications network 1 according to embodiments herein will now be described with reference to a flowchart depicted in FIG. 12*b*. The actions do not have to be taken in the order stated below, but may be taken in any suitable order. Dashed boxes indicate optional features.

Action 1211. The second network node 15 may receive from another network node, or a control network node such as the first radio network node 12 or an OAM node an indication of the release of the specification to which the other network node of the next hop is compliant.

Action 1212. The second network node 15 determines whether another network node is compliant or not with the release of the specification to which the second network node 15 is compliant.

Action 1213. The second network node 15 then handles a data packet intended for the other network node based on whether it is determined that the other network node is compliant or not with the release of the specification to which the second network node is compliant. For example, the second network node applies a header to the SDU that the network node of the next hop is compliant with.

Figure 12C:
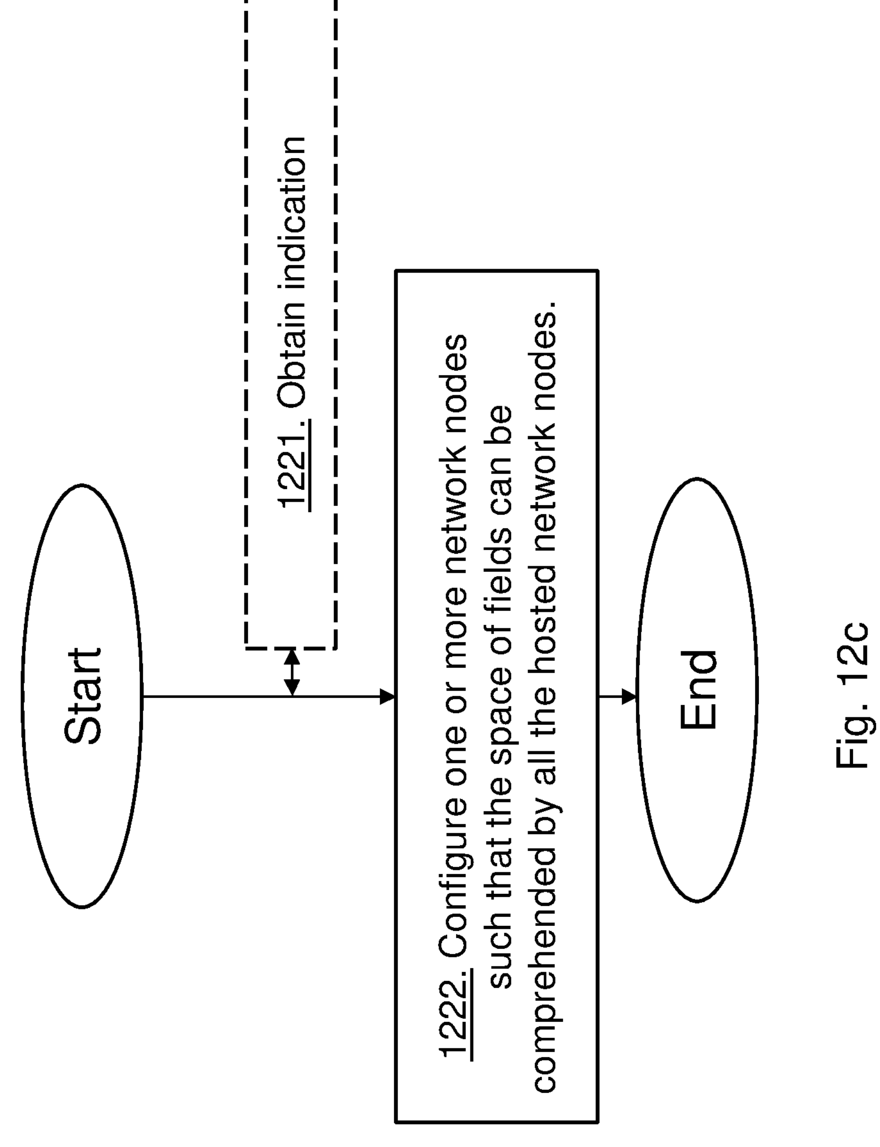
FIG. 12*c* shows a flowchart depicting a method performed by a control network node according to embodiments herein.

The method actions performed by the control network node, such as an IAB node donor or an OAM node, for handling communication in the wireless communications network 1 according to embodiments herein will now be described with reference to a flowchart depicted in FIG. 12*c*.

The actions do not have to be taken in the order stated below, but may be taken in any suitable order. Dashed boxes indicate optional features.

Action 1221. The control network node 12 may obtain one or more indications of capability of hosted network nodes such as release compliance.

Action 1222. The control network node 12 may configure IAB nodes such that the space of known fields can be comprehended by all the hosted IAB nodes. E.g. assign BAP addresses and path identities according to one and the same format.

Figure 13:
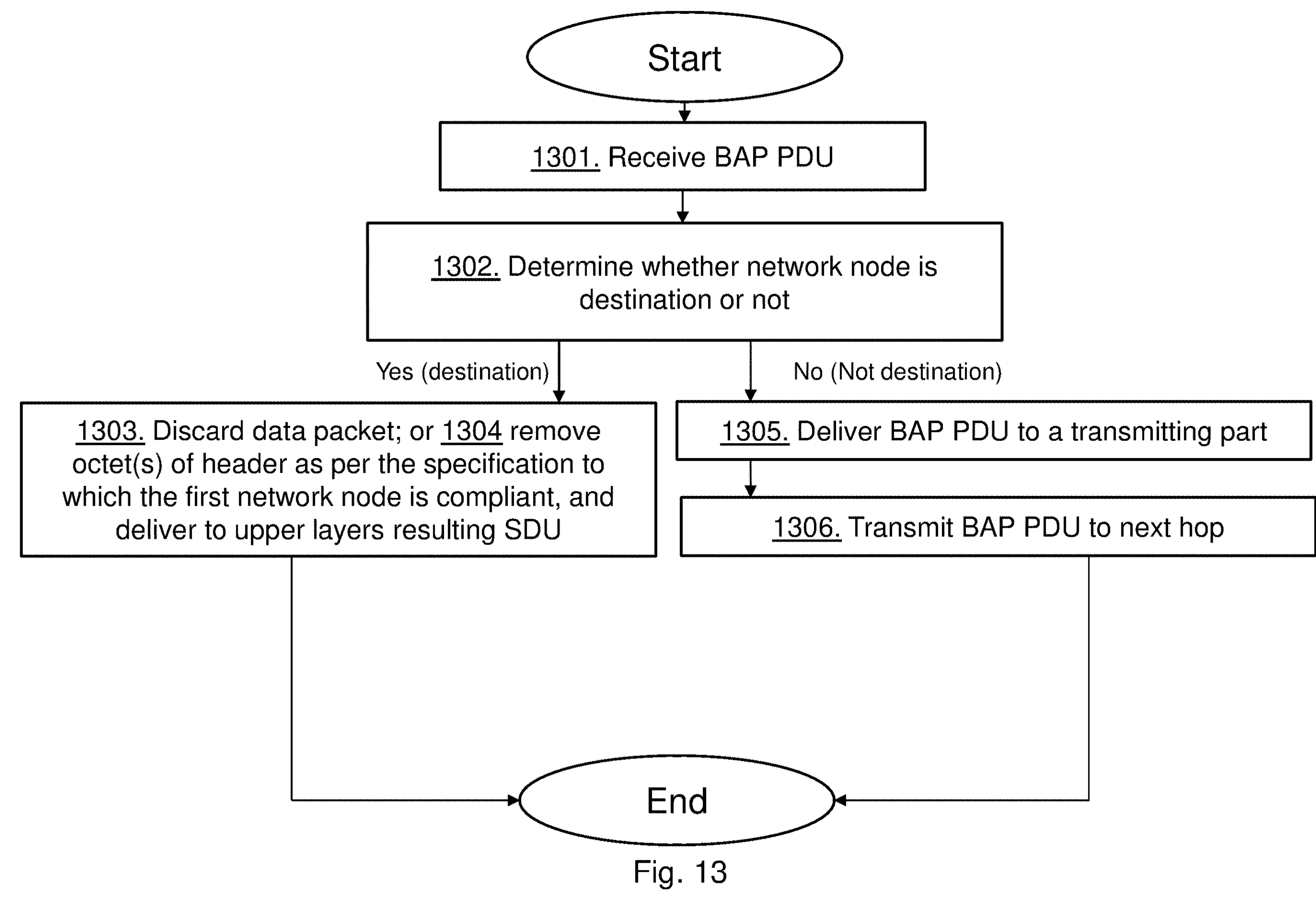
FIG. 13 shows a flowchart depicting a method performed by a first network node according to embodiments herein.

Embodiments herein comprise one or more of the following steps:

The first method, shown in FIG. 13, defined for the BAP entity of the first network node 14 exemplified as a first IAB node 14 which is an "old" IAB node, which is designed to process the received BAP PDU without stripping-off the BAP header, comprises:

Action 1301. The first IAB node 14 receives at the receiving part of the BAP entity a BAP PDU from another IAB node, such as the first intermediate node 13.

Action 1302. The first IAB node 14 determines, e.g. at the receiving part of the BAP entity, whether said BAP PDU contains in its BAP header a BAP destination which matches the BAP address of this IAB node, i.e. whether the IAB node is an "IAB access" node for said BAP PDU.

The first IAB node 14 performs one of the following actions depending on the outcome of the action 1302:

- If the outcome of the action 1302 is that the concerned IAB node is the IAB destination node for said BAP PDU
  - Action 1303. The first IAB node 14 discards the BAP PDU if said BAP PDU contains in its BAP header values which appear as "reserved" or "unknown" to said IAB node; else
  - Action 1304. The first IAB node 14 removes from the BAP PDU the octets of the BAP PDU which appear to be part of the BAP header as per the specification to which said IAB node is compliant. Deliver to upper layers the resulting BAP SDU. This method is explained in FIG. 14 below, in which the "old" IAB node strips off the portion of the BAP header that is detected as being part of the BAP header, i.e. the green part of the BAP header, and passes the remaining part of the BAP PDU to upper layers (i.e. the part which appears to be the BAP SDU), i.e. the blue part. Such remaining part may comprise one or more "new field" that the "old" IAB node does not detect as part of the BAP header. Upper layers may then process the received BAP SDU and discard from it the content not associated to data.
- If the outcome of the action 1302 is that the concerned IAB node is not an IAB destination node for said BAP PDU:
  - Action 1305. The first IAB node 14 delivers the BAP PDU to a transmitting part of the BAP entity, irrespective of whether said BAP PDU contains in its BAP header values which appear as "reserved" or "unknown" to said IAB node.
    - In one case, the action 1305 may imply that a receiving BAP entity forwards the BAP-PDU as it is (do not alter any field in the header) to the to the BAP transmitting entity. The first IAB node 14 ignores (wherein "ignore" means does not alter) the BAP header of said BAP PDU upon determining in action 1302 that said IAB node is not the IAB destination node for said BAP PDU.
    - In another case, the action 1305 implies that the IAB node takes into account that the BAP header contains "reserved" or "unknown fields". For example, it can store an information related to the fact that it received a BAP PDU containing reserved or unknown values. This information may then be reported by said IAB node to the IAB donor CU, OAM, or to the upper layers of the IAB node. The same method can be applied upon discarding in action 1303 the BAP PDU, i.e. if said IAB node is the access IAB node for the BAP PDU. In case of reporting to the CU a new F1AP message must be specified with the content of a BAP-header anomaly message.
  - Action 1306. The first IAB node 14 transmits said BAP PDU to a third IAB node 15 of the next hop, wherein the third IAB node 15 may be a new IAB node. Before transmitting the BAP PDU, the transmitting part of the BAP entity may only modify the known fields of the BAP PDU, e.g. the DESTINATION or the PATH identity associated to the BAP PDU if needed under special situations configured by the network.
    - Since the BAP header has not been stripped and unknown and reserved fields of the BAP PDU has not been changed by the transmitting part of the first IAB node 14, the third IAB node 15 can comprehend the content of the BAP PDU.

Figure 14:
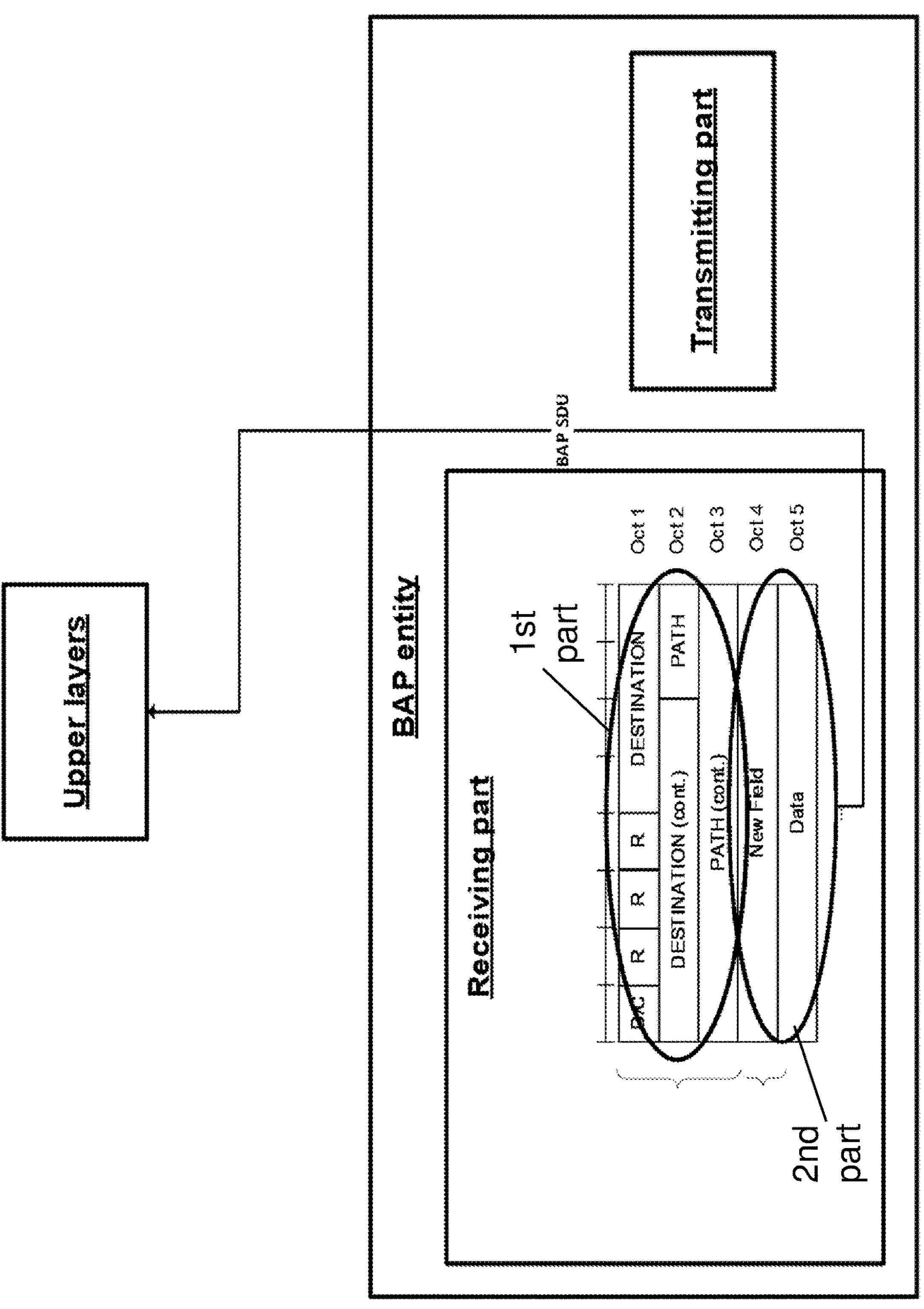
FIG. 14 shows an overview depicting a method to handle a received BAP PDU according to embodiments herein.

Thus, FIG. 14 shows an overview depicting a method to handle a received BAP PDU, in case the concerned "old" IAB node is the IAB destination node for this BAP PDU and it is implemented according to the first method and performs action 1304. The IAB node strips off the portion of the BAP header that is detected as BAP header, i.e. the 1st part of the BAP header, and passes the remaining part of the BAP PDU to upper layers, i.e. the 2nd part. Such remaining part may comprise one or more "new field" that the "old" IAB node does not detect as part of the BAP header. In this case the operation would be according to the spec to discard the packet.

Figure 15:
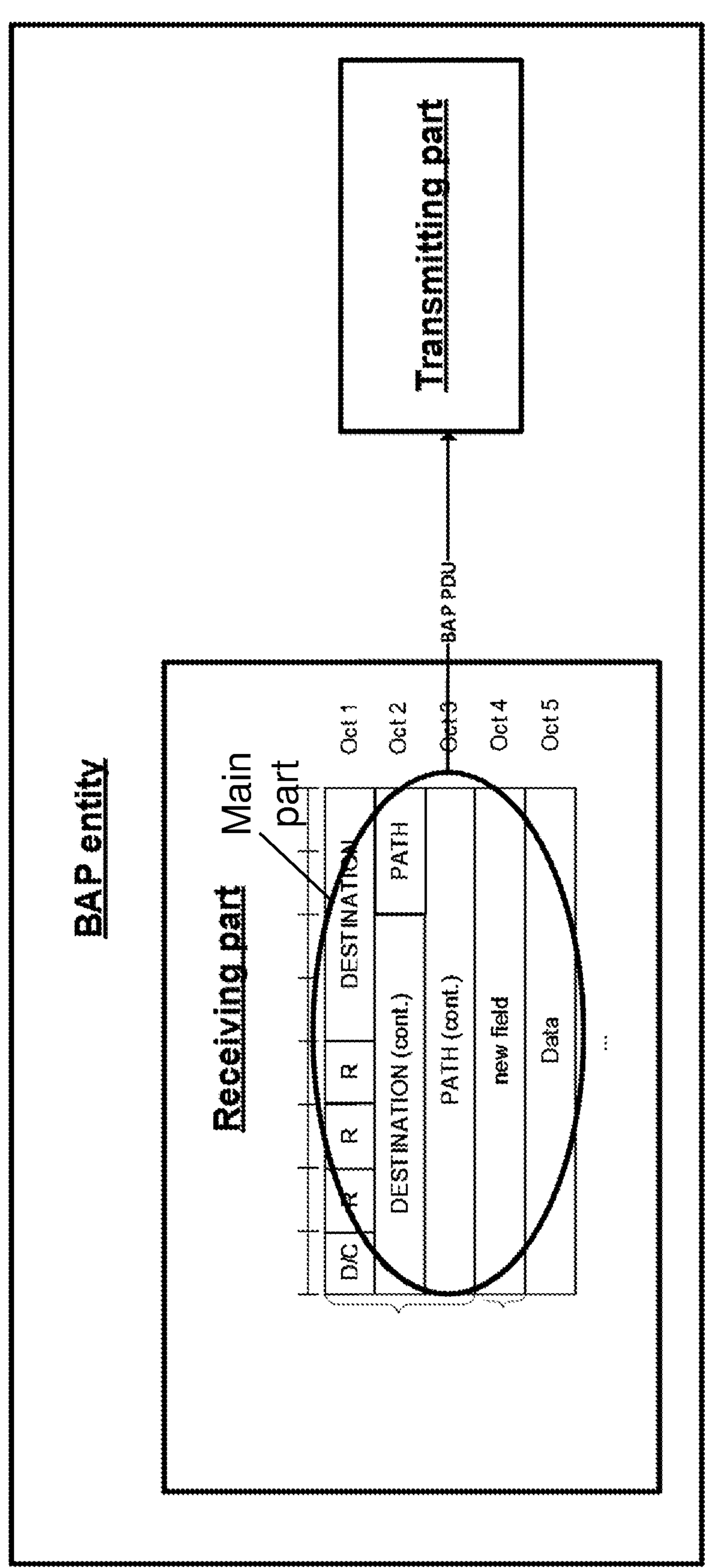
FIG. 15 shows another overview depicting a method to handle a received BAP PDU according to embodiments herein.

FIG. 15 shows an overview depicting a method to handle a received BAP PDU, in case the concerned "old" IAB node is not the IAB access node for this BAP PDU and it is implemented according to the first method and performs action 1305. The received BAP PDU, i.e. the main part, is passed by the receiving part to the transmitting part of the BAP entity, ignoring (i.e. not altering) the content of the BAP header.

Figure 16:
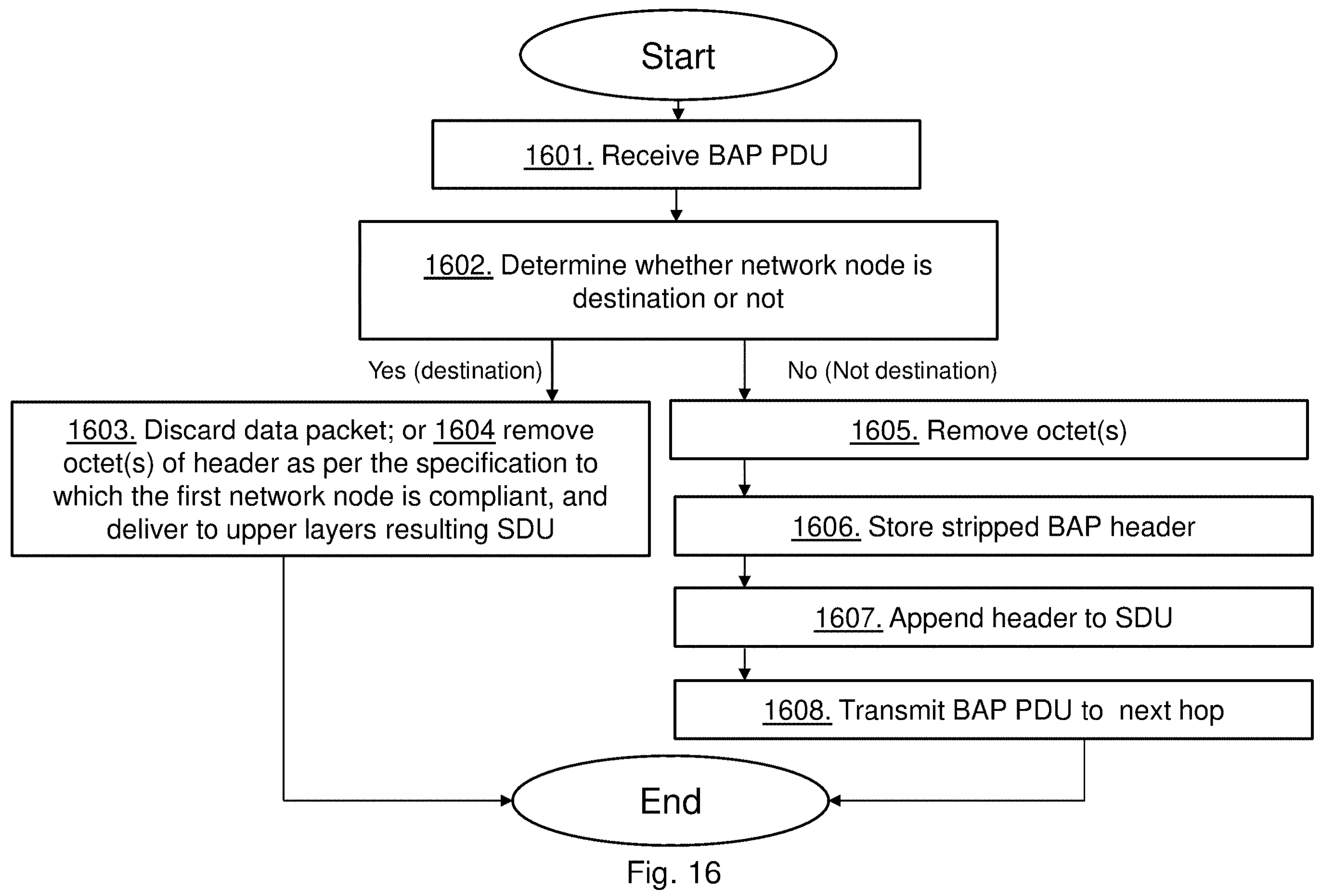
FIG. 16 shows a flowchart depicting a method performed by a first network node according to embodiments herein.

The second method, shown in FIG. 16, defined for the BAP entity of an IAB node such as the first IAB node 14 which is an "old" IAB node and which is designed to process the received BAP PDU and strip-off the BAP header, i.e. which is designed to deliver a BAP SDU to the transmitting part of the BAP entity, comprises:

Action 1601. The first IAB node 14 receives at the receiving part of the BAP entity a BAP PDU from another IAB node, such as the first intermediate node 13.

Action 1602. The first IAB node 14 determines, e.g. at the receiving part of the BAP entity, whether said BAP PDU contains in its BAP header a BAP destination which matches the BAP address of this IAB node, i.e. whether the IAB node is an "IAB access" node for said BAP PDU.

The first IAB node 14 performs one of the following actions depending on the outcome of the action 1602:

- If the outcome of the action 1602 is that the concerned IAB node is the IAB destination node for said BAP PDU Action 1603. The first IAB node 14 discards the BAP PDU if said BAP PDU contains in its BAP header values which appear as "reserved" or "unknown" to said IAB node; else Action 1604. The first IAB node 14 removes from the BAP PDU the octets of the BAP PDU which appear to be part of the BAP header as per the specification to which said IAB node is compliant. Deliver to upper layers the resulting BAP SDU. This method is explained in FIG. 14 in which the "old" IAB node strips off the portion of the BAP header that is detected as being part of the BAP header, i.e. the green part of the BAP header, and passes the remaining part of the BAP PDU to upper layers (i.e. the part which appears to be the BAP SDU), i.e. the blue part. Such remaining part may comprise one or more "new field" that the "old" IAB node does not detect as part of the BAP header. Upper layers may then process the received BAP SDU and discard from it the content not associated to data.

If the outcome of the action 1602 is that the concerned IAB node is not an IAB destination node for said BAP PDU:

Action 1605. The first IAB node 14 removes from the BAP PDU the octets of the BAP PDU which appear to be part of the BAP header as per the specification to which said IAB node is compliant.

Action 1606. The first IAB node 14 stores the above stripped BAP header and delivers the resulting BAP SDU and the stripped BAP header to the transmitting part of the BAP entity. This method is depicted in FIG. 15.

Action 1607. The first IAB node 14 appends, at the transmitting part of the BAP entity, to said BAP SDU the stripped BAP header (or a new header which is identical (i.e. same values) to the stripped BAP header). Hence generating a BAP PDU.

Action 1608. The first IAB node 14 transmits said BAP PDU to a third IAB node 15 of the next hop, wherein the third IAB node may be a new IAB node. Before transmitting the BAP PDU, the transmitting part of the BAP entity may only modify the known fields of the BAP PDU, e.g. the DESTINATION or the PATH identity associated to the BAP PDU if needed under special situations configured by the network.

Since the BAP header has been stripped and then appended again by the transmitting part of the first IAB node 14 without changing reserved or unknown values, the third IAB node 15 can comprehend the content of the BAP PDU.

Figure 17:
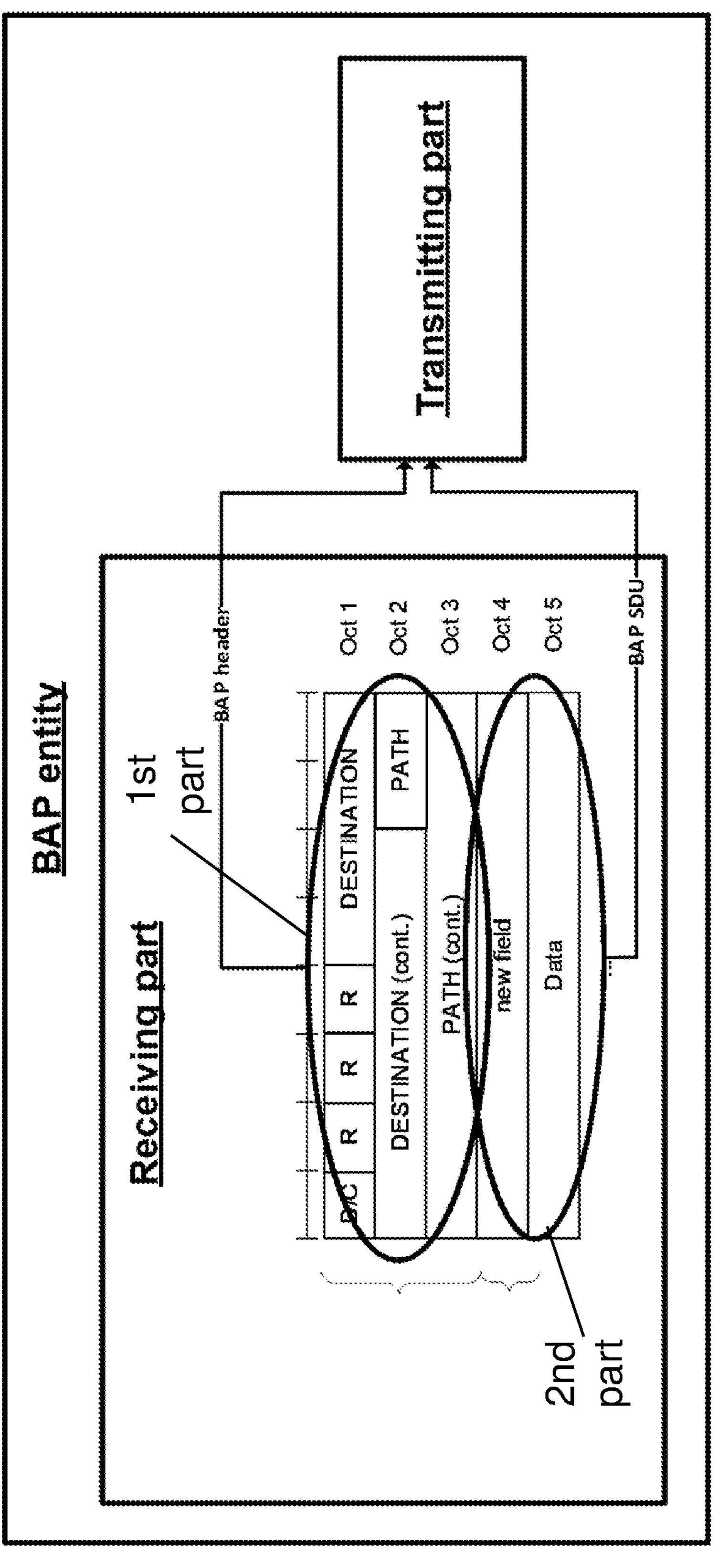
FIG. 17 shows an overview depicting a method to handle a received BAP PDU according to embodiments herein.

FIG. 17 shows an overview depicting a method to handle a received BAP PDU, in case the concerned "old" IAB node is not the IAB access node for this BAP PDU and it is designed according to the second method and action 1605 and 1606. The IAB node strips off the portion of the BAP header that is detected as BAP header, i.e. the 1st part of the BAP header, and passes both such BAP header and the remaining part of the BAP PDU to the transmitting part of the BAP entity, i.e. the 2nd part. Such remaining part may comprise one or more "new field" that the "old" IAB node does not detect as part of the BAP header.

In case the first or second methods are used, the second network node 15 does not need to be enhanced, since it can receive and comprehend the received BAP PDU transmitted by an "old" IAB node at the previous hop.

However, in case the "old" IAB node does not adopt the disclosed first and second method, a third IAB node 15 transmitting BAP packets to an "old" IAB node, needs to make sure to transmit the BAP PDU such that it can be decoded correctly by the old IAB node at the next hop. It is then defined a third method to handle this scenario.

Figure 18:
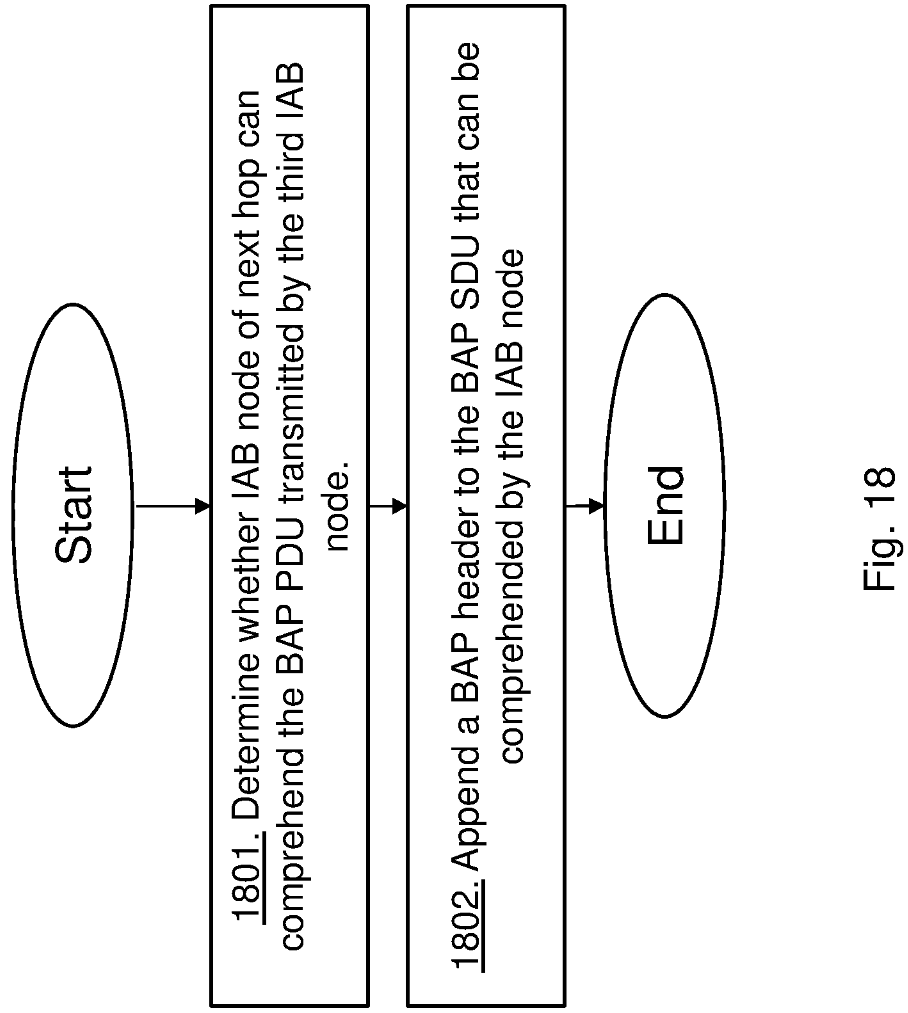
FIG. 18 shows a flowchart depicting a method performed by a second network node according to embodiments herein.

A third method, see FIG. 18, defined for the BAP entity of a third IAB node, i.e. the second network node 15, which is a "new" IAB node, comprises:

The second network node 15 determines, action 1801, whether the IAB node 14 of the next hop can comprehend the BAP PDU transmitted by the second network node 15, i.e. determining whether the IAB node 14 can set fields in the BAP header that appear as reserved or unknown to the IAB node 14. In particular, the second network node 15 determines whether the IAB node 14 of the next hop is compliant with an earlier release of the specification than that of the second network node 15;

In one method, in order to carry out this action, the IAB donor CU 12 or an operation, administration and maintenance (OAM) node may inform the second network node 15 the release of the specification to which the IAB node of the next hop is compliant. Or the IAB donor CU 12 may indicate, e.g. with a flag, whether the IAB node of the next hop can decode the BAP PDU format as specified in the release to which the second network node 15 is compliant, or whether the IAB node of the next hop is compliant with an earlier or later release of the specification.

This information can be provided by the CU to the second network node 15 via F1 signalling, e.g. as part of the BH Routing table configuration or IAB-MT context setup of the next hop node or via OAM, so that the second network node 15 can determine whether the IAB node associated to the next hop for the PATH identity indicated in the BAP PDU can comprehend the BAP PDU as specified in the release of the specification to which the third IAB node is compliant. So this would basically imply that the CU provides this information to the second network node 15 with in a signaling structure per path ID and per destination, i.e. per BAP Routing ID. That is because the next hop that the second network node 15 selects for a given BAP PDU may differ depending on the PATH and DESTINATION of such BAP PDU In another method, one or more of the reserved fields in the BAP header can be used to indicate the release of the specification to which a certain IAB node is compliant. For example assuming that the second network node 15 needs to send the concerned BAP PDU in the downstream to the first IAB node, i.e. the IAB node 14 is a next hop node for the second network node 15 in the downstream direction, and that the IAB node 14 considers the second network node 15 as next hop or parent node for some upstream traffic, the second network node 15 will always receive BAP PDU with reserved fields not set. Hence, the second network node 15 deduces that the IAB node 14 is compliant with an earlier or later release of the specification.

In yet another method, a dedicated BAP control PDU can be exchanged between the parent or second network node 15 and child or downstream node 14 for indicating their compliant release of the specification. This control PDU can be exchanged after the downstream node is integrated into the network. The second network node 15 will send a control PDU, in response the downstream node will also send a control PDU to indicate which release of the specification the downstream node supports, or vice versa.

Note: In the above it is used as example that the second network node 15 is made aware of "the release of the specification" to which the IAB node of the next hop is compliant. However, another potential way to address the issue is that the second network node 15 is made aware of if the node of the next hop supports a certain set of features. This set of feature may be the complete set of features that the next IAB node supports, or a subset therefore, for example only the subset which relates to potential fields in the BAP header, thus, an indication of the supported release of the specification.

If, upon action 1801, the IAB node 14 of the next hop is determined to be of an earlier release, the second network node may append, action 1802, a BAP header to the BAP SDU that can be comprehended by the IAB node 14.

This action may imply removing from a BAP PDU, received by the second network node 15, the BAP header, if the BAP header is determined to be not comprehended by the IAB node 14 of the next hop. And then append to the resulting BAP SDU, a new BAP header compliant with the release of the IAB node of the next hop. In case the BAP SDU is received from upper layers, this action just implies appending a BAP header to the BAP SDU that can be comprehended by the IAB node 14.

A fourth method defined for an IAB donor CU such as the radio network node 12 which hosts IAB nodes of different releases. In case there are fields in the BAP header which are known by all the hosted IAB nodes, but that have been enhanced, e.g. the number of bits/octets associated to one known field have been increased/reduced, the IAB donor CU should make sure to configure the IAB nodes such that the space of such known fields can be comprehended by all the hosted IAB nodes.

For example, let's consider the DESTINATION and PATH field of the BAP header. The DESTINATION and PATH fields are known by the Rel.16 IAB nodes. The DESTINATION and/or the PATH field may be extended in a later release to accommodate more BAP addresses and traffic paths. Such extension cannot obviously be comprehended by the Rel.16 IAB nodes. In case the gNB-CU hosts a mixture of Rel.16 IAB nodes and IAB nodes of later releases, the gNB-CU should ensure that the DESTINATION/PATH fields adopted should be comprehended by the Rel.16 IAB nodes, at least for all the nodes that are serving traffic associated to a certain path for a certain destination. This for example will imply that the gNB-CU may assign BAP addresses and path identities according to the Rel.16 formats.

Figure 19:
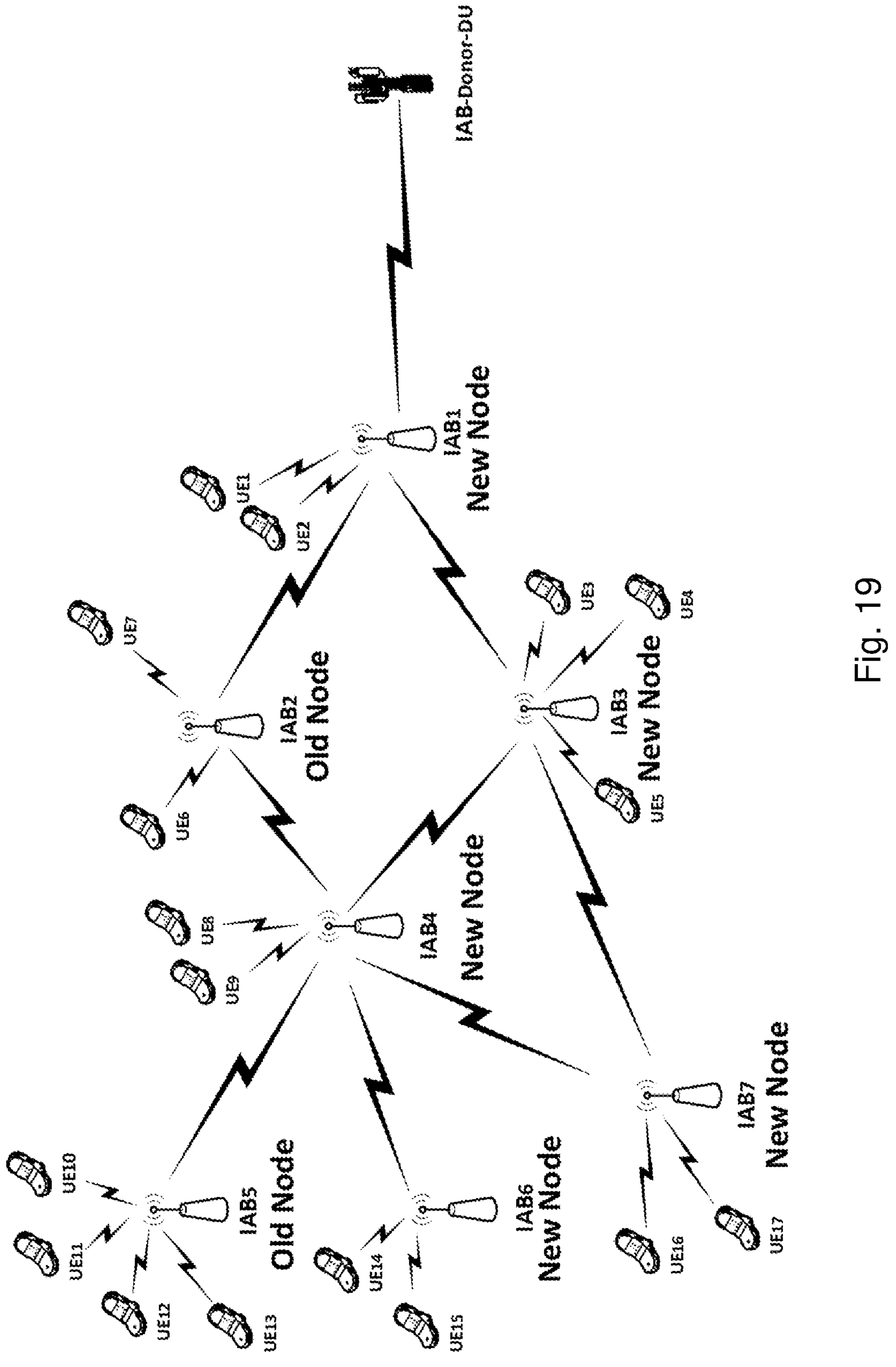
FIG. 19 shows an IAB network with IAB nodes of different releases communicating between each other.

A fifth method may be defined for an IAB donor CU such as the radio network node 12 to configure the IAB donor DU such as the first intermediate network node 13. Note that IAB donor DU 13 adds BAP header to the packets received from the upper layers, and IAB donor CU 12 adds an appropriate BAP header, i.e., Rel-16 or Rel-17, to packets based on the release, and/or features, supported by the destination node, i.e., access IAB node 14, BAP entity, release, and/or features, supported by the BAP entities of the intermediate IAB nodes BAP that the packets have to transverse, QoS requirements/profile of the traffic, etc. For example, for some UE bearers traffic served by IAB access node IAB7, for the scenario shown in FIG. 19, that required advance features supported by Rel-17 IAB enhancement BAP header, the IAB donor DU will follow the mapping rules, configured by IAB donor CU, and so will use Rel-17 BAP header before routing the packets towards the egress link with IAB3. On the other hand, for other types of UE traffic, e.g., best-effort traffic, served by the IAB access node that does not require advanced features but just routing, the IAB donor DU will use Rel-16 header for such traffic and will forward the traffic on the egress link towards IAB2. Similarly, the IAB donor CU 12 may route traffic served by the access IAB node IAB7 that does not require advanced feature of Rel-17 via path IAB1-IAB3-IAB-7 but employ Rel-16 BAP header.

Below is an example showing how some aspects of embodiments could be implemented in the BAP-specification, 3GPP TS 38.340 v16.2.0. The changes compared to current specification are shown with bold and underlined text.

In this change the IAB node such as the first network node 14 which, for a BAP PDU is an intermediate IAB node, i.e. not an IAB access node, will refrain from discarding a packet solely based on that the BAP header contains reserved values or the BAP PDU contains a BAP address which is not included in the configured BH Routing Configuration and is not the BAP address of this node is received. Instead this would Note: in both these implementations below, the else-clause may be considered superfluous since if the IAB does not discard as per the below, it may be implied that the node shall process the BAP PDU.

5.5 Handling of unknown, unforeseen, and erroneous protocol data
When a BAP PDU that contains reserved or invalid values or contains a BAP address which is not included in the configured BH Routing Configuration and is not the BAP address of this node is received, the BAP entity shall:

- -if the node is an IAB destination node:
  - discard the received BAP PDU
- else:
  - process the BAP PDU.

Alternatively, this implementation is possible which would result in that the IAB node still discards a BAP PDUs in case the BAP header/routing addresses are faulty.

5.5 Handling of unknown, unforeseen, and erroneous protocol data
When a BAP PDU that contains reserved or invalid values or contains a BAP address which is not included in the configured BH Routing Configuration and is not the BAP address of this node is received, the BAP entity shall:

- -if node is an IAB destination node or the BAP PDU contains a BAP address which is not included in the configured BH Routing Configuration and it is not the BAP address of this node is received:
  - discard the received BAP PDU
- else:
  - process the BAP PDU.

FIG. 20 is a block diagram depicting the first network node 14 for handling communication in a wireless communications network 1 according to embodiments herein.

The first network node 14 may comprise processing circuitry 2001, e.g. one or more processors, configured to perform the methods herein.

The first network node 14 may comprise a receiving unit 2002, e.g., a receiver or a transceiver. The first network node 14, the processing circuitry 2001, and/or the receiving unit 2002 is configured to receive the data packet with the header comprising the indicated destination, with the BAP address, and one or more values interpreted by the first network node 14 as reserved or unknown. For example, the first network node 14, the processing circuitry 2001, and/or the receiving unit 2002 may be configured to receive a data packet with a header (BAP header) from, e.g., a parent network node or a child network node.

The first network node 14 may comprise a determining unit 2003. The first network node 14, the processing circuitry 2001, and/or the determining unit 2003 is configured to check whether the first network node is an intended destination of the data packet based on the indicated destination in the header. The first network node 14, the processing circuitry 2001, and/or the determining unit 2003 may be configured to determine or check whether the first network node is an intended destination of the data packet. For example, determine whether said BAP PDU contains in its BAP header a BAP destination which matches the BAP address of this IAB node.

The first network node 14 may comprise a handling unit 2004. The first network node 14, the processing circuitry 2001, and/or the handling unit 2004 is configured to, with the proviso that the first network node is not the intended destination of the data packet and the BAP address is not included in the configured BH routing configuration, discard the data packet. Else, the first network node 14, the processing circuitry 2001, and/or the handling unit 2004 is configured to process the data packet. For example, the first network node 14, the processing circuitry 2001, and/or the handling unit 2004 may be configured to, with the proviso that the first network node is intended as the destination of the data packet or the BAP address is included in the configured BH routing configuration, process the data packet. To process the data packet may comprise transmitting said data packet to the second network node of a next hop irrespective that the header comprises the one or more values interpreted by the first network node as reserved or unknown; or removing one or more octets of the header comprising the one or more reserved or invalid values; and sending a service data unit to upper layer.

The first network node 14, the processing circuitry 2001, and/or the handling unit 2004 may be configured to, with the proviso that the first network node 14 is the intended destination of the data packet the first network node 14, discard the data packet if said data packet contains in its BAP header values which appear as "reserved" or "unknown" to the first network node; or remove from the data packet one or more octets of the data packet which appear to be part of the header as per the specification to which the first network node is compliant, and to deliver to upper layers a resulting SDU.

The first network node 14, the processing circuitry 2001, and/or the handling unit 2004 may be configured to, with the proviso that the first network node 14 is not the intended destination of the data packet the first network node 14, transmit said data packet to the second network node 15 such as a third IAB node of the next hop irrespective that the header comprises one or more values which appear as "reserved" or "unknown" to said first network node 14.

The first network node 14, the processing circuitry 2001, and/or the handling unit 2004 may be configured to store an information related to the fact that it received a packet data containing reserved or unknown values, and to report the information to an IAB donor, an OAM node, or to the upper layers of the first network node 14. The first network node 14 further comprises a memory 2005. The memory 2005 comprises one or more units to be used to store data on, such as indications, headers, destination address, measurements, thresholds, data related to nodes, and applications to perform the methods disclosed herein when being executed, and similar. Furthermore, the first network node 14 may comprise a communication interface 2006 such as comprising a transmitter, a receiver and/or a transceiver, and/or one or more antennas.

The methods according to the embodiments described herein for the first network node 14 are respectively implemented by means of e.g. a computer program product 2007 or a computer program, comprising instructions, i.e., software code portions, which, when executed on at least one processor, cause the at least one processor to carry out the actions described herein, as performed by the first network node 14. The computer program product 2007 may be stored on a computer-readable storage medium 2008, e.g. a disc, a universal serial bus (USB) stick or similar. The computer-readable storage medium 2008, having stored thereon the computer program product, may comprise the instructions which, when executed on at least one processor, cause the at least one processor to carry out the actions described herein, as performed by the first network node. In some embodiments, the computer-readable storage medium may be a transitory or a non-transitory computer-readable storage medium. Thus, embodiments herein may disclose a first network node for handling communication in a wireless communications network, wherein the first network node comprises processing circuitry and a memory, said memory comprising instructions executable by said processing circuitry whereby said first network node is operative to perform any of the methods herein.

FIG. 21 is a block diagram depicting the second network node 15 such as a IAB node supporting a later release than the first network node 14, for handling communication in a wireless communications network 1 according to embodiments herein.

The second network node 15 may comprise processing circuitry 2101, e.g. one or more processors, configured to perform the methods herein.

The second network node 15 may comprise a receiving unit 2102, e.g. a receiver or a transceiver. The second network node 15, the processing circuitry 2101, and/or the receiving unit 2102 may be configured to receive from another network node, or a control network node such as the first radio network node 12 or an OAM node the indication of the release of the specification to which another network node of the next hop is compliant.

The second network node 15 may comprise a determining unit 2103. The second network node 15, the processing circuitry 2101, and/or the determining unit 2103 is configured to determine whether another network node is compliant or not with the release of the specification to which the second network node 15 is compliant.

The second network node 15 may comprise a handling unit 2104. The second network node 15, the processing circuitry 2101, and/or the handling unit 2104 is configured to handle a data packet intended for the other network node based on whether it is determined that the other network node is compliant or not with the release of the specification to which the second network node is compliant. For example, to apply a header to the SDU that the network node of the next hop is compliant with.

The second network node 15 further comprises a memory 2105. The memory 2105 comprises one or more units to be used to store data on, such as indications, contexts, release compliance, measurements, thresholds, data related to nodes, and applications to perform the methods disclosed herein when being executed, and similar. Furthermore, the second network node 15 may comprise a communication interface 2108 such as comprising a transmitter, a receiver and/or a transceiver, and/or one or more antennas.

The methods according to the embodiments described herein for the second network node 15 are respectively implemented by means of e.g. a computer program product 2106 or a computer program, comprising instructions, i.e., software code portions, which, when executed on at least one processor, cause the at least one processor to carry out the actions described herein, as performed by the second network node 15. The computer program product 2106 may be stored on a computer-readable storage medium 2107, e.g. a disc, a universal serial bus (USB) stick or similar. The computer-readable storage medium 2107, having stored thereon the computer program product, may comprise the instructions which, when executed on at least one processor, cause the at least one processor to carry out the actions described herein, as performed by the second network node 15. In some embodiments, the computer-readable storage medium may be a transitory or a non-transitory computer-readable storage medium. Thus, embodiments herein may disclose a second network node 15 for handling communication in a wireless communications network, wherein the second network node comprises processing circuitry and a memory, said memory comprising instructions executable by said processing circuitry whereby said second network node is operative to perform any of the methods herein.

Figure 22:
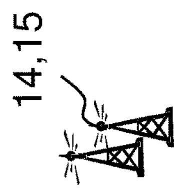
FIG. 22 shows a block diagram depicting embodiments of a control network node according to embodiments herein.
Figure 22:
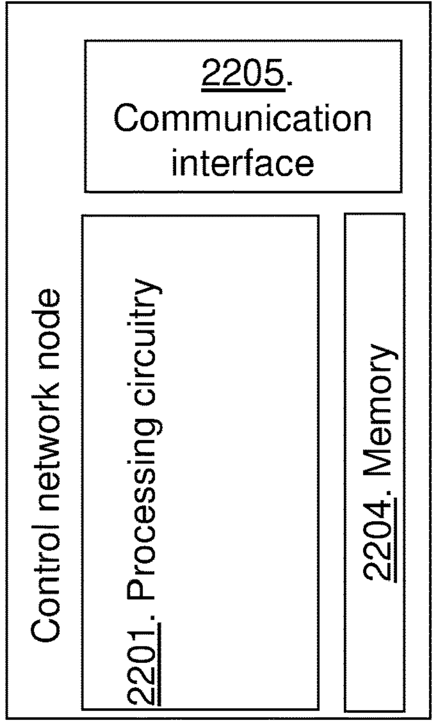
Figure 22:
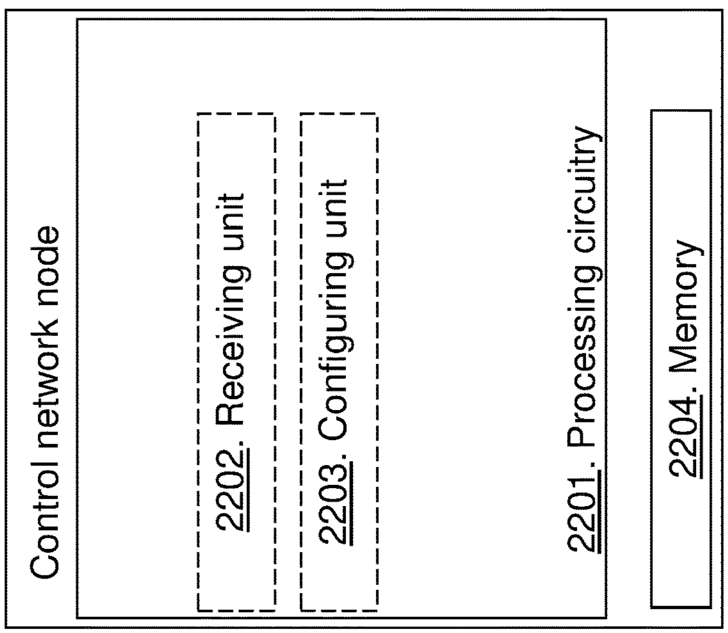
Figure 22:
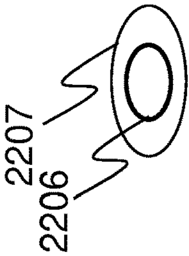

FIG. 22 is a block diagram depicting the control network node such as an IAB donor 12 or an OAM node, for handling communication in the wireless communications network 1 according to embodiments herein.

The control network node may comprise processing circuitry 2201, e.g. one or more processors, configured to perform the methods herein.

The control network node may comprise a receiving unit 2202, e.g. a receiver or a transceiver. The control network node, the processing circuitry 2201, and/or the receiving unit 2202 may be configured to receive from another network node, or a control network node such as the first radio network node 12 or an OAM node the indication of release compliance of one or more network nodes hosted by the control network node.

The control network node may comprise a configuring unit 2203. The control network node, the processing circuitry 2201, and/or the configuring unit 2203 is configured to configure IAB nodes such that the space of known fields can be comprehended by all the hosted IAB nodes. E.g. assign BAP addresses and path identities according to one and the same format.

The control network node further comprises a memory 2204. The memory 2204 comprises one or more units to be used to store data on, such as indications, contexts, release compliances, measurements, thresholds, data related to nodes, and applications to perform the methods disclosed herein when being executed, and similar. Furthermore, the control network node may comprise a communication interface 2205 such as comprising a transmitter, a receiver and/or a transceiver, and/or one or more antennas.

The methods according to the embodiments described herein for the control network node are respectively implemented by means of e.g. a computer program product 2206 or a computer program, comprising instructions, i.e., software code portions, which, when executed on at least one processor, cause the at least one processor to carry out the actions described herein, as performed by the control network node. The computer program product 2206 may be stored on a computer-readable storage medium 2207, e.g. a disc, a universal serial bus (USB) stick or similar. The computer-readable storage medium 2207, having stored thereon the computer program product, may comprise the instructions which, when executed on at least one processor, cause the at least one processor to carry out the actions described herein, as performed by the control network node. In some embodiments, the computer-readable storage medium may be a transitory or a non-transitory computer-readable storage medium. Thus, embodiments herein may disclose a control network node for handling communication in a wireless communications network, wherein the control network node comprises processing circuitry and a memory, said memory comprising instructions executable by said processing circuitry whereby said control network node is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 23:
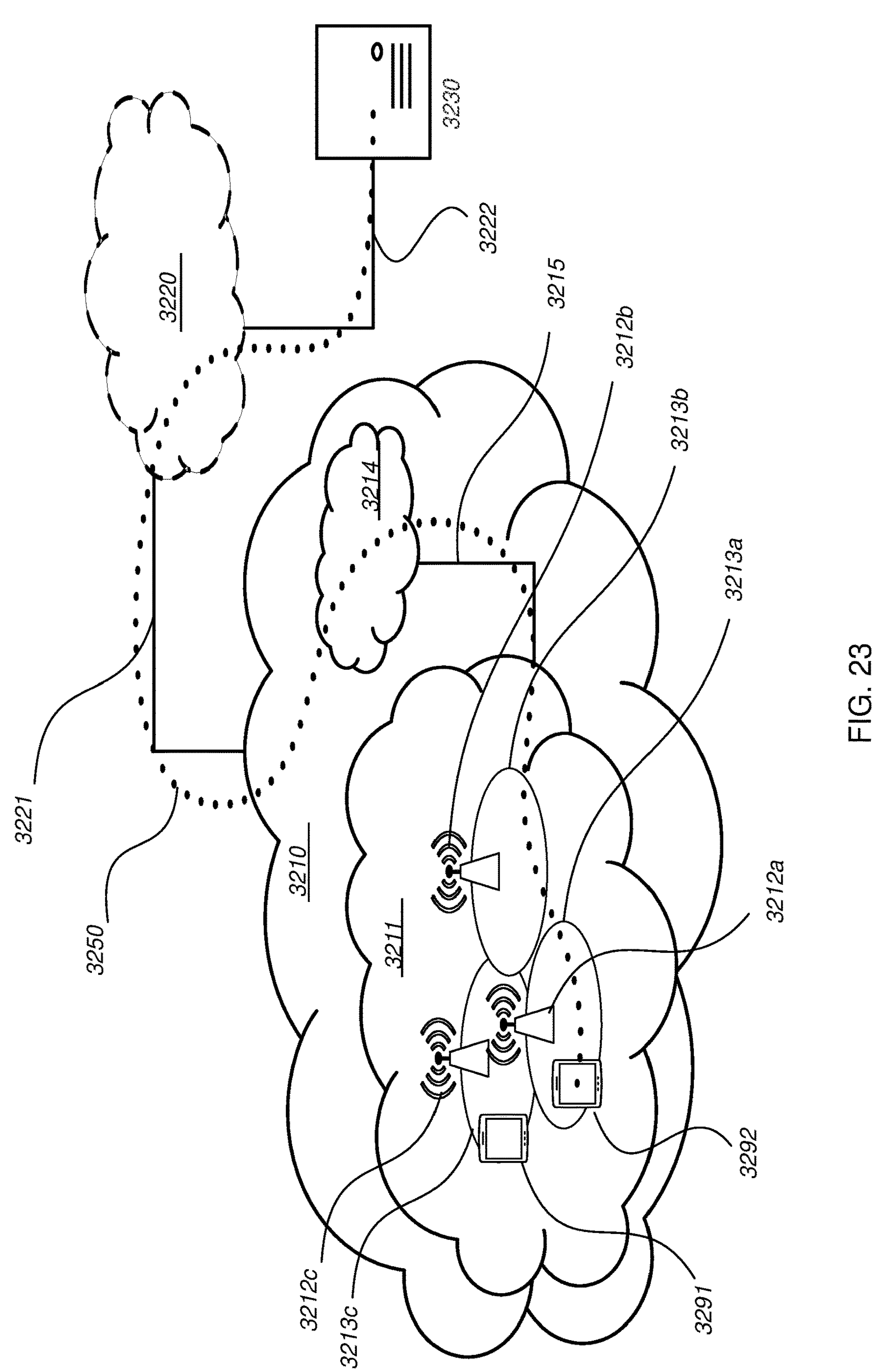
FIG. 23 schematically illustrates a telecommunication network connected via an intermediate network to a host computer.

FIG. 23 shows a Telecommunication network connected via an intermediate network to a host computer in accordance with some embodiments. With reference to FIG. 23, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 23 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 24:
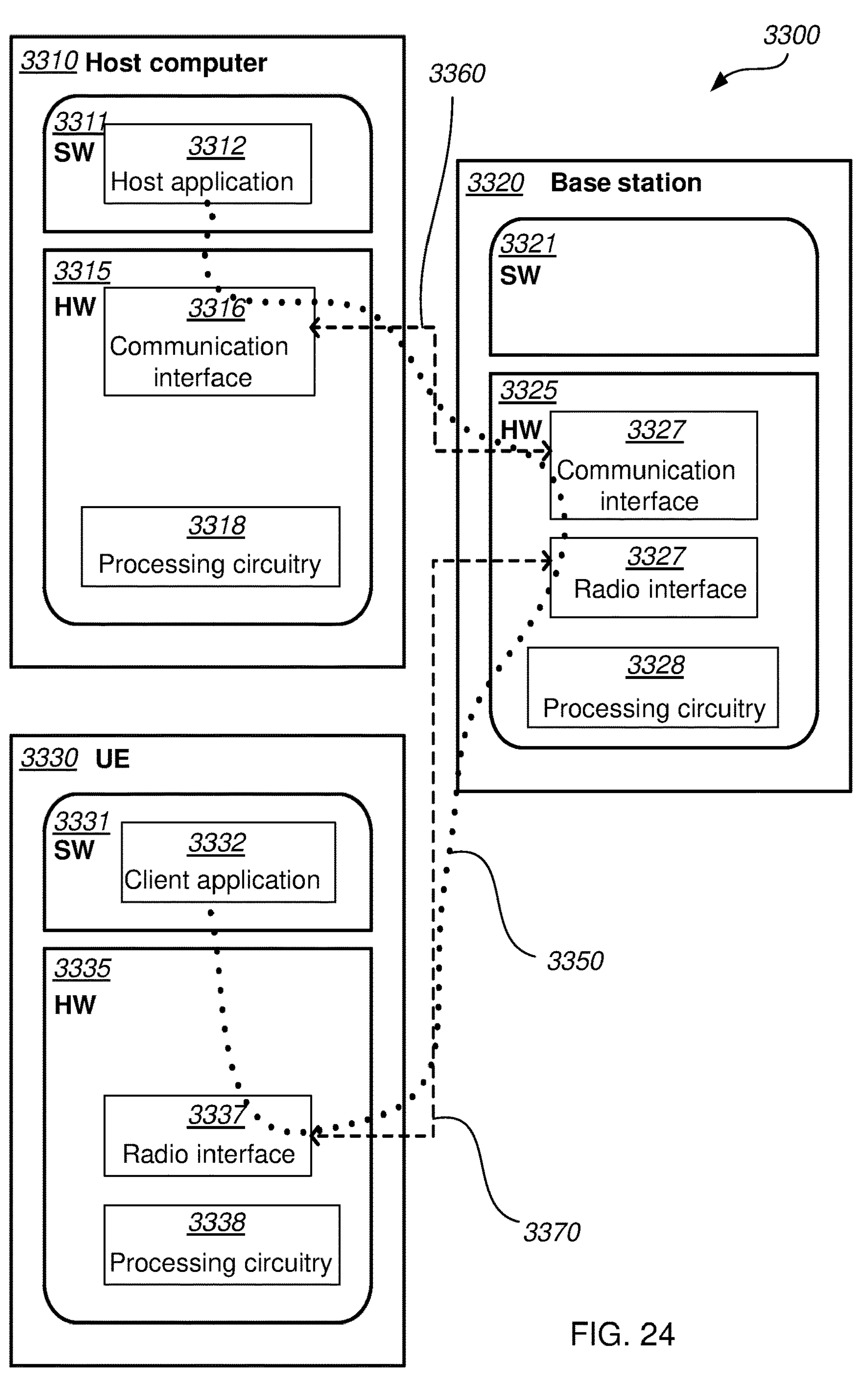
FIG. 24 is a generalized block diagram of a host computer communicating via a base station with a user equipment over a partially wireless connection.

FIG. 24 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 24. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 24) served by base station 3320. Communication interface 3326 may be configured to facilitate connection 3360 to host computer 3310. Connection 3360 may be direct or it may pass through a core network (not shown in FIG. 24) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 24 may be similar or identical to host computer 3230, one of base stations 3212*a*, 3212*b*, 3212*c* and one of UEs 3291, 3292 of FIG. 23, respectively. This is to say, the inner workings of these entities may be as shown in FIG. 24 and independently, the surrounding network topology may be that of FIG. 23.

In FIG. 24, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible for handling or managing data packets of different release versions of the specification in an efficient manner resulting in a reduced delay of packet transmissions and a quick responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 25, 26:
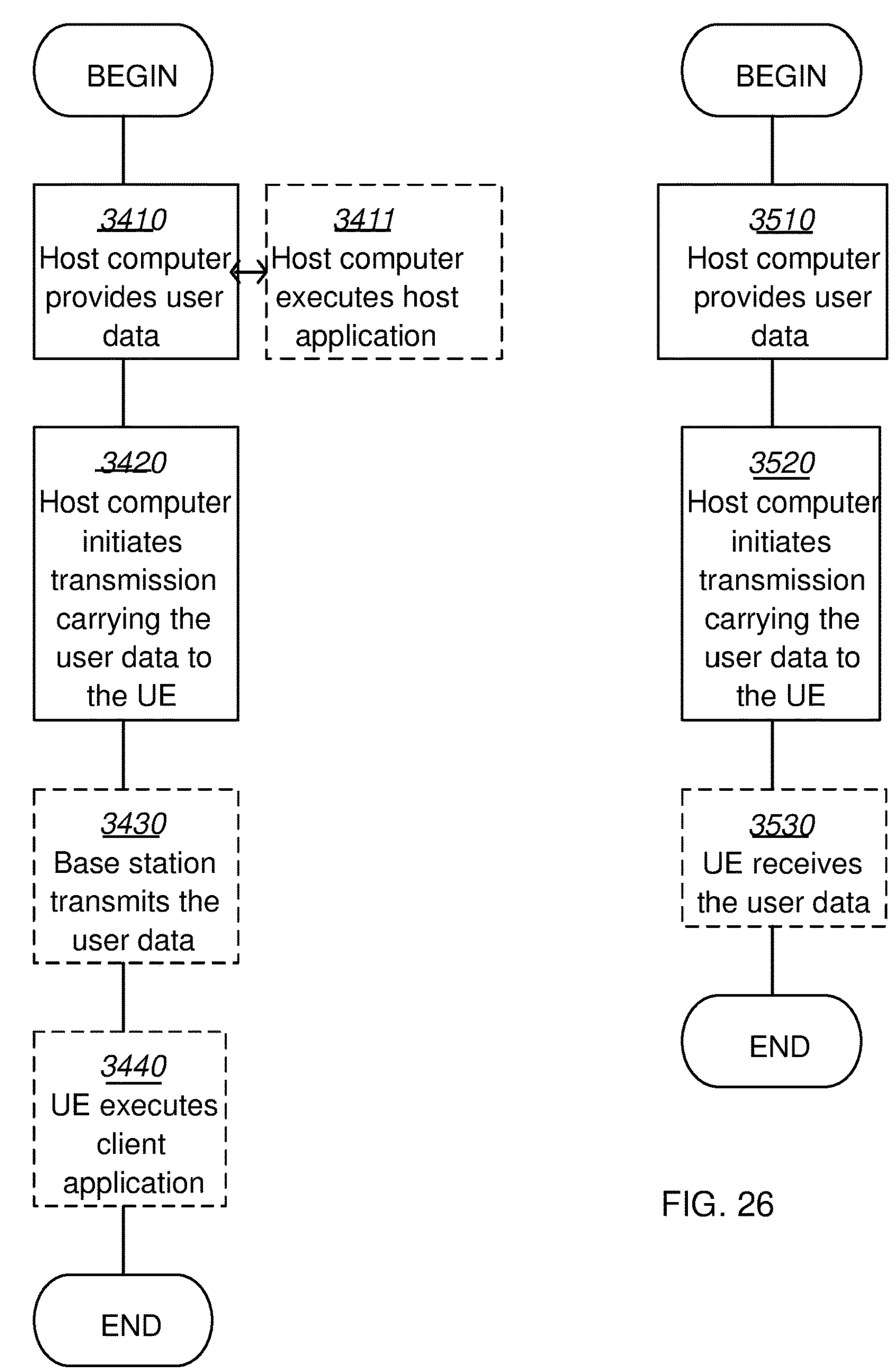
FIGS. 25-28 are flowcharts illustrating methods implemented in a communication system including a host computer, a base station and a user equipment.

FIG. 25 shows methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 25 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 26 shows methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 26 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 27, 28:
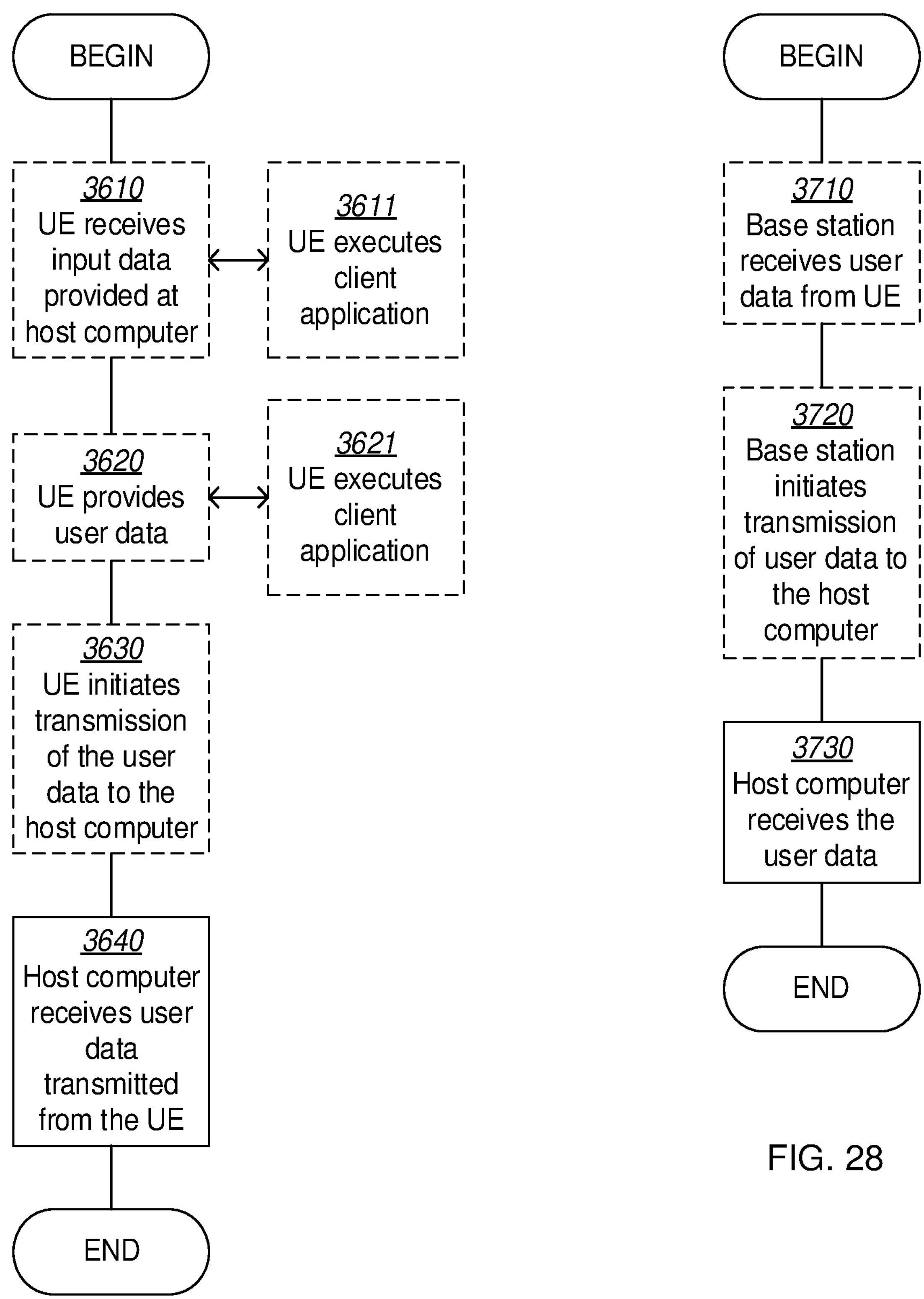

FIG. 27 shows methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 27 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 28 show methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 28 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

| Abbreviation | Explanation |
|---|---|
| ACK | (positive) Acknowledgment |
| AUL | Autonomous uplink |
| BLER | Block error rate |
| BWP | Bandwidth Part |
| CAPC | Channel access priority class |
| CBG | Code block group |
| CCA | Clear channel assessment |
| CO | Channel occupancy |
| COT | Channel occupancy time |
| CWS | Contention window size |
| DL | Downlink |
| ED | Energy detection |
| eNB | 4G base station |

-continued

| Abbreviation | Explanation |
|---|---|
| gNB | 5G base station |
| HARQ | Hybrid automatic repeat request |
| IS | In synch |
| LAA | Licensed assisted access |
| LBT | Listen before talk |
| MAC | Medium access control |
| MCOT | Maximum channel occupancy time |
| NACK | Negative acknowledgment |
| NDI | New data indicator |
| NR | 3GPP defined 5G radio access technology |
| NR-U | NR unlicensed |
| OOS | out of synch |
| PCell | Primary cell |
| PCI | Physical cell identity |
| PDCCH | A downlink control channel |
| PDU | Protocol data unit |
| PHICH | Physical channel Hybrid ARQ Indicator Channel |
| PLMN | Public land mobile network |
| PSCell | Primary SCG cell |
| PUCCH | Physical Uplink Control Channel |
| PUSCH | Physical Uplink Shared Channel |
| QCI | QoS class identifier |
| QoS | Quality of service |
| RAT | Radio access technology |
| RLF | Radio link failure |
| RLM | Radio link monitoring |
| RLC | Radio link control |
| RRC | Radio resource control |
| RS | Reference signal |
| SCG | Secondary cell group |
| SDU | Service data unit |
| SMTC | SSB-based measurement timing configuration |
| SpCell | Special cell (PCell or PSCell) |
| SPS | Semi persistent scheduling |
| TTI | Transmission time interval |
| UCI | Uplink Control Information |
| UE | User equipment |
| UL | Uplink |

The invention claimed is:

1. A method performed by a first network node for handling communication in a wireless communications network, the method comprising:

receiving a data packet with a header comprising an indicated destination, with a Backhaul Adaptation Protocol, BAP, address, and one or more values interpreted by the first network node as reserved or unknown based on a release version of a communications protocol specification to which the first network node is compliant;

checking whether the first network node is an intended destination of the data packet based on the indicated destination in the header;

when the first network node is not the intended destination of the data packet and the BAP address is not included in a configured backhaul, BH, routing configuration, discarding the data packet; and when the first network node is the intended destination of the data packet or the BAP address is included in a configured BH routing configuration, processing the data packet irrespective of whether the header comprises the one or more values interpreted by the first network node as reserved or unknown.

2. The method according to claim 1, wherein the first network node is an Integrated Access Backhaul, IAB, node.

3. The method according to claim 1, wherein processing the data packet comprises transmitting said data packet to a second network node of a next hop irrespective that the header comprises the one or more values interpreted by the first network node as reserved or unknown; or removing one or more octets of the header comprising the one or more reserved or invalid values; and sending a service data unit to upper layer.

4. The method according to claim 1, further comprising storing information related to the fact that first network node received a packet data containing reserved or unknown values, and reporting the information to an IAB donor, an operation, administration and maintenance, OAM, node, or to the upper layers of the first network node.

5. A method performed by a second network node for handling communication in a wireless communications network, the method comprising:

determining whether another network node is compliant or not with a release version of a communications protocol specification to which the second network node is compliant; and handling a data packet intended for the other network node based on whether it is determined that the other network node is compliant or not with the release version of the communications protocol specification to which the second network node is compliant, wherein handling the data packet comprises applying a header compliant with a release version of a communications protocol specification supported by the another network node.

6. A computer program product comprising a non-transitory computer-readable storage medium that stores instructions which, when executed on at least one processor, cause the at least one processor to carry out the method according to claim 1, as performed by the first network node.

7. A computer program product comprising a non-transitory computer-readable medium that stores instructions which, when executed on at least one processor, cause the at least one processor to carry out the method according to claim 5, as performed by the second network node.

8. The method according to claim 5, further comprising receiving from the other network node, or a control network node an indication of a release version of the communications protocol specification to which the other network node of the next hop is compliant.

9. The method according to claim 7, wherein the second network node is an Integrated Access Backhaul, IAB, node.

10. A method performed by a control network node for managing communication in a wireless communications network, the method comprising:

configuring Integrated Access Backhaul (IAB) nodes such that a space of known fields in a Backhaul Adaptation Protocol (BAP) header is comprehended by all the IAB nodes, wherein the configuring comprises assigning addresses and path identities according to a same format for all the IAB nodes, irrespective of whether the IAB nodes are compliant with different release versions of a communications protocol specification.

11. A first network node for handling communication in a wireless communications network, wherein the first network node comprises processing circuitry that is configured to:

receive a data packet with a header comprising an indicated destination, with a Backhaul Adaptation Protocol, BAP, address, and one or more values interpreted by the first network node as reserved or unknown based on a release version of a communications protocol specification to which the first network node is compliant;

check whether the first network node is an intended destination of the data packet based on the indicated destination in the header;

when the first network node is not the intended destination of the data packet and the BAP address is not included in a configured backhaul, BH, routing configuration, discard the data packet; and when the first network node is the intended destination of the data packet or the BAP address is included in a configured BH routing configuration, process the data packet irrespective of whether the header comprises the one or more values interpreted by the first network node as reserved or unknown.

12. The first network node according to claim 11, wherein the first network node is an Integrated Access Backhaul, IAB, node.

13. The first network node according to claim 11, wherein the first network node is configured to process the data packet by transmitting said data packet to a second network node of a next hop irrespective that the header comprises the one or more values interpreted by the first network node as reserved or unknown; or by removing one or more octets of the header comprising the one or more reserved or invalid values, and sending a service data unit to upper layer.

14. The first network node according to claim 11, wherein the first network node is configured to store information related to the fact that first network node received a packet data containing reserved or unknown values, and to report the information to an IAB donor, an OAM node, or to the upper layers of the first network node.

15. A second network node for handling communication in a wireless communications network, wherein the second network node comprises processing circuitry that is configured to:

determine whether another network node is compliant or not with a release version of a communications protocol specification to which the second network node is compliant; and handle a data packet intended for the other network node based on whether it is determined that the other network node is compliant or not with the release version of the communications protocol specification to which the second network node is compliant, wherein handling the data packet comprises applying a header compliant with a release version of a communications protocol specification supported by the another network node.

16. The second network node according to claim 15, wherein the second network node is further configured to receive from the other network node, or a control network node an indication of a release version of the communications protocol specification to which the other network node of the next hop is compliant.

17. The second network node according to claim 15, wherein the second network node is an Integrated Access Backhaul, IAB, node.

18. A control network node for managing communication in a wireless communications network, wherein the control network node is configured to:

configure Integrated Access Backhaul, IAB, nodes wherein such that a space of known fields in a Backhaul Adaptation Protocol (BAP) header is comprehended by all the IAB nodes, wherein the configuring comprises assigning addresses and path identities according to a same format for all the IAB nodes, irrespective of whether the IAB nodes are compliant with different release versions of a communications protocol specification.

* * * * *